US010691708B2

(12) United States Patent
Ito et al.

(10) Patent No.: US 10,691,708 B2
(45) Date of Patent: Jun. 23, 2020

(54) INFORMATION PROCESSING APPARATUS, INFORMATION PROCESSING METHOD, AND INFORMATION PROCESSING PROGRAM

(71) Applicant: Rakuten, Inc., Tokyo (JP)

(72) Inventors: Masanaka Ito, Tokyo (JP); Ryohei Takuma, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 395 days.

(21) Appl. No.: 14/426,787

(22) PCT Filed: Apr. 9, 2013

(86) PCT No.: PCT/JP2013/060681
§ 371 (c)(1),
(2) Date: Mar. 9, 2015

(87) PCT Pub. No.: WO2014/041833
PCT Pub. Date: Mar. 20, 2014

(65) Prior Publication Data
US 2015/0220606 A1  Aug. 6, 2015

(30) Foreign Application Priority Data
Sep. 14, 2012 (JP) ................................ 2012-203237

(51) Int. Cl.
*G06F 16/248* (2019.01)
*G06F 16/2455* (2019.01)
(Continued)

(52) U.S. Cl.
CPC ........ *G06F 16/248* (2019.01); *G06F 16/2455* (2019.01); *G06Q 10/06314* (2013.01); *G06Q 10/1095* (2013.01); *G06Q 50/10* (2013.01)

(58) Field of Classification Search
CPC ......... G06F 17/30864; G06F 17/30867; G06F 17/30991
(Continued)

(56) References Cited

U.S. PATENT DOCUMENTS 7,343,312 B2 * 3/2008 Capek ................. G06Q 10/109
705/7.19
7,703,048 B2 * 4/2010 Alford, Jr. .......... G06Q 10/109
715/747
(Continued)

FOREIGN PATENT DOCUMENTS

JP   8-96056 A    4/1996
JP   11-353390 A  12/1999
(Continued)

OTHER PUBLICATIONS

International Search Report for PCT/JP2013/060681 dated Jul. 16, 2013.

*Primary Examiner* — Hosain T Alam
*Assistant Examiner* — Robert F May
(74) *Attorney, Agent, or Firm* — Sughrue Mion, PLLC

(57) ABSTRACT

A reservation for two or more continuous time frames can be easily made. An information processing apparatus searches for two or more time continuous frames that can be reserved according to a user's request. In addition, the information processing apparatus searches for two or more continuous time frames including at least one reserved time frame in response to a request from the user and having a possibility of being able to be reserved as another user who has reserved the reserved time frames accepts movement of the reserved time frames. Then, a result of a search for two or more continuous time frames that can be reserved and a result of a search for two or more continuous time frames that include a reserved time frame and have a possibility of being able to (Continued)

be reserved are presented in modes distinguishable from each other.

11 Claims, 19 Drawing Sheets

(51) Int. Cl.
    *G06Q 50/10*     (2012.01)
    *G06Q 10/10*     (2012.01)
    *G06Q 10/06*     (2012.01)

(58) Field of Classification Search
    USPC .......................................................... 707/722
    See application file for complete search history.

(56) References Cited

U.S. PATENT DOCUMENTS

| | | | |
|---|---|---|---|
| 8,180,657 B2* | 5/2012 | O'Sullivan | G06Q 10/02 705/26.61 |
| 2005/0197877 A1* | 9/2005 | Kalinoski | G06Q 10/06 705/7.19 |
| 2005/0273372 A1* | 12/2005 | Bowne | G06Q 10/02 705/5 |
| 2009/0164259 A1* | 6/2009 | Mizrachi | G06Q 10/02 705/5 |
| 2011/0184943 A1* | 7/2011 | Norton | G06Q 10/02 707/723 |

FOREIGN PATENT DOCUMENTS

| | | | |
|---|---|---|---|
| JP | 2003-141066 A | 5/2003 | |
| JP | 2006-209459 A | 8/2006 | |

* cited by examiner

FIG.2A

| TIME FRAME (START TIME) | RESERVABLE/NON-RESERVABLE | RESERVING PERSON | PLAY PERSON NUMBER |
|---|---|---|---|
| 7:00 | RESERVABLE | | |
| 7:07 | NON-RESERVABLE | USER B | FOUR PERSONS |
| 7:14 | RESERVABLE | | |
| 7:21 | RESERVABLE | | |
| 7:28 | NON-RESERVABLE | USER C | FOUR PERSONS |
| 7:35 | NON-RESERVABLE | USER C | FOUR PERSONS |
| 7:42 | RESERVABLE | | |
| 7:49 | RESERVABLE | | |
| 7:56 | NON-RESERVABLE | USER D | TWO PERSONS |

FIG.2B

| FOUR CONTINUOUS FRAMES | POSSIBILITY OF RESERVATION | MOVEMENT OF RESERVED FRAME TO BE ABLE TO BE RESERVED |
|---|---|---|
| 7:00~7:21 | PRESENCE | MOVE 7:07 TO 7:42 |
| 7:07~7:28 | PRESENCE | MOVE 7:07 TO 7:00<br>MOVE 7:28 AND 7:35 TO 7:42 AND 7:59 |
| 7:14~7:35 | PRESENCE | MOVE 7:28 AND 7:35 TO 7:42 AND 7:59 |
| 7:21~7:42 | NO-PRESENCE | NO TWO-CONTINUOUS VACANT TIME FRAMES |
| 7:28~7:49 | PRESENCE | MOVE 7:28 AND 7:35 TO 7:14 AND 7:21 |
| 7:35~7:56 | PRESENCE | MOVE 7:28 AND 7:35 TO 7:14 AND 7:21<br>MOVE 7:56 TO 7:00 |

FIG.2C

| FACTOR | CALCULATION CRITERION OF RESERVATION PROBABILITY SCORE |
|---|---|
| NUMBER OF RESERVED FRAMES | AS NUMBER OF RESERVED FRAMES INCREASES, PROBABILITY DECREASES |
| NUMBER OF PLAYERS IN RESERVED FRAME | AS NUMBER OF PERSONS INCREASES, PROBABILITY DECREASES |
| NUMBER OF RESERVATION-COMPLETED PERSONS (NUMBER OF RESERVED GROUPS) | AS NUMBER OF GROUPS INCREASES, PROBABILITY DECREASES |
| TIME REQUIRED FOR RESERVATION FOR RESERVED FRAME | AS TIME IS LONGER, PROBABILITY DECREASES |
| NUMBER OF SEARCHES | AS NUMBER OF SEARCHES INCREASES, PROBABILITY DECREASES |
| DESIRED START TIME SLOT | IN CASE WHERE THERE IS TIME FRAME OF MOVEMENT DESTINATION CANDIDATE IN DESIRED START TIME SLOT, PROBABILITY IS HIGH |
| TENDENCY OF TIME SLOT RESERVED BY RESERVATION-COMPLETED PERSON | IN CASE WHERE TIME FRAME OF MOVEMENT DESTINATION CANDIDATE IS PRESENT IN TIME SLOT TENDING TO BE STRONGLY RESERVED, PROBABILITY IS HIGH |
| TENDENCY OF RESERVATION-COMPLETED PERSON FOR RESERVING IMMEDIATELY AFTER RESERVED FRAME OF OTHER PERSON | IN CASE TENDENCY IS LOW, PROBABILITY OF CHANGING TO TIME FRAME OF MOVEMENT DESTINATION CANDIDATE IMMEDIATELY AFTER RESERVED FRAME OF OTHER PERSON IS LOW |
| SKILLS OF MEMBER PLAYING GOLF IN RESERVED FRAMES OF OTHER PERSON | PROBABILITY OF CHANGING TO TIME FRAME OF MOVEMENT DESTINATION CANDIDATE IMMEDIATELY AFTER RESERVED FRAME OF OTHER PERSON OF WHICH SKILL OF MEMBER IS LOW IS LOW |
| DEGREE OF EASINESS OF MOVEMENT FROM ADDRESS OF RESERVATION-COMPLETED PERSON TO GOLF LINKS | AS DEGREE OF EASINESS OF MOVEMENT INCREASES, PROBABILITY INCREASES |

FIG.4A

TIME FRAME SELECTION
AAA GOLF CLUB    BBB PLAN

| COURSE | RESERVATION OF FIVE CONTINUOUS FRAMES | RESERVATION PROBABILITY | START TIME (SEVEN MINUTE INTERVAL) | RESERVATION |
|---|---|---|---|---|
| OUT | BEING ABLE TO BE RESERVED | | 10:30~10:58 | RESERVATION |
| OUT | BEING ABLE TO BE RESERVED | | 11:05~11:33 | RESERVATION |
| OUT | NOT BEING ABLE TO BE RESERVED | C | 12:12~12:40 | RESERVATION |
| OUT | NOT BEING ABLE TO BE RESERVED | B | 14:37~15:05 | RESERVATION |
| OUT | BEING ABLE TO BE RESERVED | | 14:51~15:19 | RESERVATION |
| OUT | NOT BEING ABLE TO BE RESERVED | A | 15:33~16:01 | RESERVATION |

PROBABILITY OF BEING ABLE TO BE RESERVED    A HIGH ⇔ C LOW

FIG.4B

TIME FRAME SELECTION
AAA GOLF CLUB    BBB PLAN

THERE ARE NO FIVE CONTINUOUS TIME FRAMES THAT CAN BE RESERVED

| COURSE | RESERVATION OF FIVE CONTINUOUS FRAMES | RESERVATION PROBABILITY | START TIME (SEVEN MINUTE INTERVAL) | RESERVATION |
|---|---|---|---|---|
| OUT | NOT BEING ABLE TO BE RESERVED | C | 12:12~12:40 | RESERVATION |
| OUT | NOT BEING ABLE TO BE RESERVED | B | 14:37~15:05 | RESERVATION |
| OUT | NOT BEING ABLE TO BE RESERVED | A | 15:33~16:01 | RESERVATION |

PROBABILITY OF BEING ABLE TO BE RESERVED    A HIGH ⇔ C LOW

FIG.7A

THERE WAS REQUEST FOR MOVEMENT OF TIME FRAME THAT IS CURRENTLY RESERVED

CURRENT RESERVATION
RESERVATION NUMBER  01234567
GOLF LINKS AAA GOLF CLUB
PLAY DATE: OCT. 1, 2012
NUMBER OF GROUPS  1
START TIME  14:37

START TIME OF MOVEMENT DESTINATION
10:30 10:37 10:44 10:51…

POINT CAN BE ACQUIRED ACCORDING TO MOVEMENT OF TIME FRAME

PLEASE ACCESS FOLLOWING URL FOR DETERMINATION OF APPROVAL/DISAPPROVAL OF CHANGE IN START TIME
http://www.golf.co.jp/xxxxxxxxxxxxxx/xxxxxxxxxxxxxx

FIG.7B

APPROVAL OF MOVEMENT OF TIME FRAME

310 — START TIME OF MOVEMENT DESTINATION

○ 10:30    ○ 11:12
○ 10:37    ○ 11:19
○ 10:44       :
○ 10:51       :
○ 10:58
○ 11:05

APPROVE    DISAPPROVE
  320          330

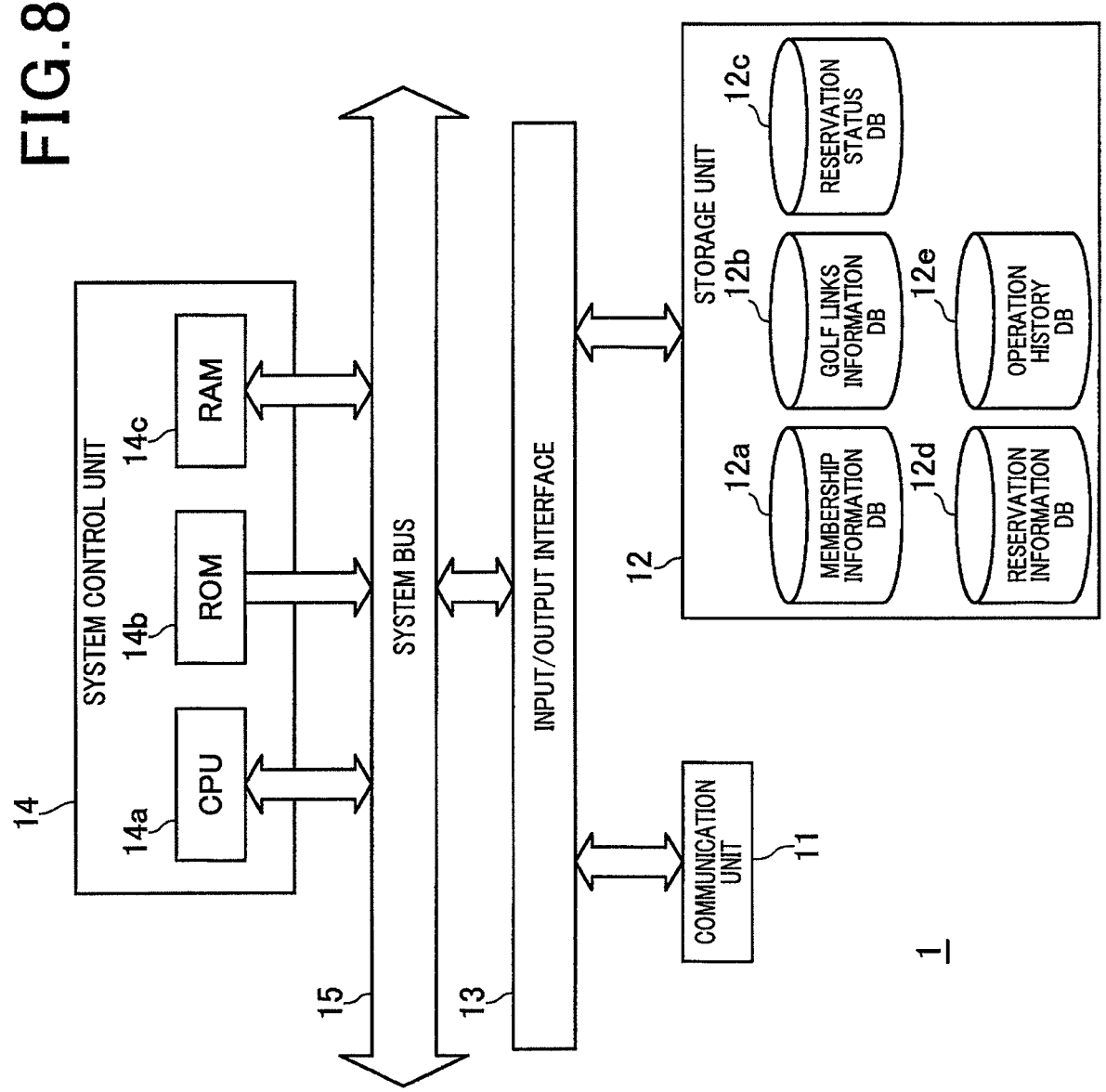

FIG.9A

MEMBER INFORMATION DB — 12a

| |
|---|
| USER ID |
| PASSWORD |
| NICK NAME |
| NAME |
| DATE OF BIRTH |
| GENDER |
| ZIP CODE |
| PHONE NUMBER |
| ELECTRONIC MAIL ADDRESS |
| HANDICAP |
| OWNED POINT NUMBER |
| . . . |

FIG.9B

GOLF LINKS INFORMATION DB — 12b

| |
|---|
| GOLF LINKS ID |
| GOLF LINKS NAME |
| ZIP CODE |
| ADDRESS |
| PHONE NUMBER |
| FAX NUMBER |
| ELECTRONIC MAIL ADDRESS |
| TIME FRAME INFORMATION |
| PLAN INFORMATION |
| . . . |

FIG.9C

RESERVATION STATUS DB — 12c

| |
|---|
| GOLF LINKS ID |
| COURSE ID |
| PLAY DATE |
| START TIME |
| RESERVATION FLAG |
| RESERVATION NUMBER |
| . . . |

FIG.9D

RESERVATION INFORMATION DB — 12d

| | |
|---|---|
| RESERVATION NUMBER | |
| RESERVATION DATE AND TIME | |
| USER ID | |
| GOLF LINKS ID | |
| PLAN ID | |
| COURSE ID | |
| PLAY DATE | |
| START TIME | |
| FRAME NUMBER | |
| GROUP INFORMATION | FIRST GROUP INFORMATION |
| | SECOND GROUP INFORMATION |
| | . . . |
| FEE | |
| SEARCH CONDITION | |
| . . . | |

FIG.9E n-TH GROUP INFORMATION — 12e

| |
|---|
| START TIME |
| PLAY PERSON NUMBER |
| MEMBER LIST |

FIG.9F

OPERATION HISTORY DB — 12f

| |
|---|
| USER ID |
| OPERATION DATE AND TIME |
| URL |
| . . . |

FIG.18

RESERVATION INFORMATION DB — 12d

| RESERVATION NUMBER |||
|---|---|---|
| RESERVATION DATE AND TIME |||
| USER ID |||
| GOLF LINKS ID |||
| PLAN ID |||
| COURSE ID |||
| PLAY DATE |||
| START TIME |||
| FRAME NUMBER |||
| GROUP INFORMATION | FIRST GROUP INFORMATION ||
| | SECOND GROUP INFORMATION ||
| | . . . ||
| FEE |||
| SEARCH CONDITION |||
| MOVABLE TIME SLOT |||
| . . . |||

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2013/060681 filed Apr. 9, 2013, claiming priority based on Japanese Patent Application No. 2012-203237 filed Sep. 14, 2012, the contents of all of which are incorporated herein by reference in their entirety.

TECHNICAL FIELD

The present invention relates to a technical field of an information processing apparatus and an information processing method searching for time frames that can be reserved based on the number of time frames in which a user desires to use a place.

BACKGROUND ART

In the past, technologies for reserving a place through a network are known. For example, Patent Literature 1 discloses a system for reserving a golf links. More specifically, in paragraph [0040] and FIG. 13 of Patent Literature 1, it is described that a user inputs the number of start groups desiring to make a reservation, a system searches for continuous time slots in which the start groups can make a reservation, and, in a case where the user cannot secure desired continuous time slots for the start groups, the system connects a reservation call from the user to an operator. In reserving a golf links, inputting the number of groups corresponds to designating the number of time frames in which golf plays are started.

PRIOR ART LITERATURE

Patent Literature

Patent Literature 1: JP 8-96056 A

SUMMARY OF THE INVENTION

Problem to be Solved by the Invention

However, in the technology disclosed in Patent Literature 1, in a case where at least one time frame has already been reserved by another user among two or more continuous time frames desired by the user, a reservation for the continuous two or more time frames cannot be accepted.

The present invention was made in consideration of the above-described points, and an object thereof is to provide an information processing apparatus, an information processing method, and an information processing program enabling an easy reservation for continuous two or more time frames.

Means for Solving the Problem

In order to solve the above problem, according to an embodiment, there is provided an information processing apparatus including:

a first search means that searches for two or more continuous time frames that can be reserved in response to a request from a user among a plurality of time frames set as use time frames of a place;

a second search means that searches for two or more continuous time frames including at least one reserved time frame in response to a request from the user and having a possibility of being able to be reserved as another user who has reserved the reserved time frames accepts movement of the reserved time frames; and a presentation control means that presents a search result according to the first search means and a search result according to the second search means in modes distinguishable from each other.

In a case where two or more continuous time frames according to a user's request include at least one reserved time frame, if another user who has reserved the reserved time frame accepts movement of the reserved time frame, the two or more continuous time frames according to the user's request can be reserved. Thus, in a case where there is a possibility that another user accepts the movement of the reserved time frame, the two or more continuous time frames according to the user's request also have a possibility of being able to be reserved. According to the present invention, a result of a search for two or more continuous time frames having a possibility of being able to be reserved is presented in a mode distinguishable from a result of a search for two or more continuous time frames that can be reserved. Thus, the two or more continuous time frames can be reserved in an easy manner.

The information processing apparatus further includes an estimation means that estimates a probability of the time frame retrieved by the second search means being able to be reserved and the presentation control means that controls the presentation mode of information of time frames retrieved by the second search means based on the probability estimated by the estimation means.

According to the present invention, based on the probability of being able to be reserved, the presentation mode of information of two or more continuous time frames having a possibility of being able to be reserved is changed. Accordingly, the user can recognize the probability of being able to be reserved.

The information processing apparatus includes the estimation means that estimates the probability based on the number of reserved time frames included in the time frame retrieved by the second search means.

According to the present invention, based on the number of reserved time frames included in the two or more continuous time frames according to a user's request, the probability of being able to be reserved is estimated. For this reason, the burden of the adjustment of schedules for the movement of a time frame can be reflected on the presentation mode of the information of the two or more continuous time frames having a possibility of being able to be reserved.

The information processing apparatus includes the estimation means that estimates the probability based on the number of persons intended to use the place in the reserved time frame included in the time frame retrieved by the second search means.

According to the present invention, based on the number of persons scheduled to use the reserved time frame included in the two or more continuous time frames according to a user's request, the probability of being able to be reserved is estimated. For this reason, the user's burden of the adjustment of schedules for the movement of a time frame can be reflected on the presentation mode of the information of the two or more continuous time frames having a possibility of being able to be reserved.

The information processing apparatus includes the estimation means that specifies other users who respectively have reserved one or more of the reserved time frames included in the time frame retrieved by the second search means and estimates the probability based on the number of the other users who have made the reservations.

According to the present invention, based on a total number of persons reserving one or more reserved time frames included in the two or more continuous time frames according to a user's request, the probability of being able to be reserved is estimated. In a case the probability of acceptance of movement of the time frame is considered to be estimated for each person making the reservation, the probability of being able to be reserved is a multiplication of probabilities of acceptance of movement of the time frames. Accordingly, such a situation can be reflected on the presentation mode of the information of the two or more continuous time frames having a possibility of being able to be reserved.

The information processing apparatus includes the estimation means that estimates the probability based on a movement width from the reserved time frame included in the time frame retrieved by the second search means to a time frame that can be reserved except for the time frames retrieved by the second search means.

According to the present invention, based on a movement width at the time of moving the reserved time frame to a time slot that can be reserved, the probability of being able to be reserved is estimated. For this reason, the user's burden of the adjustment of schedules for the movement of the time frame can be reflected on the presentation mode of the information of the two or more continuous time frames having a possibility of being able to be reserved.

The information processing apparatus includes the estimation means that estimates the probability based on time required until the other users reserve the reserved time frames after requesting searches.

According to the present invention, based on a time required for another user until a reservation is made, the probability of being able to be reserved is estimated. For this reason, the degree of pondering until the person makes a reservation can be reflected on the presentation mode of the information of the two or more continuous time frames having a possibility of being able to be reserved.

The information processing apparatus includes the estimation means that estimates the probability based on the number of searches requested by the other users until the reserved time frames are reserved by the other users.

According to the present invention, based on the number of searches tried until another user makes a reservation, the probability of being able to be reserved is estimated. For this reason, the degree of pondering until the another user makes a reservation can be reflected on the presentation mode of the information of the two or more continuous time frames having a possibility of being able to be reserved.

The information processing apparatus includes the estimation means that estimates the probability based on a reservation status of a range excluding the time frames retrieved by the second search means in time slots designated by the other users as search conditions for searching for the reserved time frames.

A time slot designated by another user as a search condition is considered to be a time slot that is desired to be reserved by the another user more than a range excluding the time slot. Accordingly, in a case where there is a time frame that can be reserved in the time slot designated as the search condition, the probability that the another user accepts the movement of the time frame is considered to be higher than that of a case where there is no time frame that can be reserved in a range excluding the time slot designated as the search condition. According to the present invention, based on the reservation status of the time slot designated by the another user as the search condition, the probability of being able to be reserved is estimated. For this reason, the time slot desired by the another user can be reflected on the presentation mode of the information of the two or more continuous time frames having a possibility of being able to be reserved.

The information processing apparatus, further includes a result acquiring means that acquires, from a reservation result storing means that stores a reservation result including the reserved time frames in association with identification information used for identifying the user who has made the reservation, the reservation result associated with the identification information of the other users, wherein the estimation means estimates the probability based on a tendency of reservations acquired based on the reservation result that is acquired by the result acquiring means.

According to the present invention, the tendency of another user for reservations can be reflected on the presentation mode of the information of the two or more continuous time frames having a possibility of being able to be reserved.

The information processing apparatus includes the estimation means estimates the probability based on a tendency of the other users for reserving time frames, which can be reserved, excluding the time frames retrieved by the second search means.

According to the present invention, based on the tendency of another user for reserving a time frame, which can be reserved, that is the candidate for a movement destination, the probability of being able to be reserved is estimated. Accordingly, the tendency of the time slot reserved by another user can be reflected on the presentation mode of the information of the two or more continuous time frames having a possibility of being able to be reserved.

The information processing apparatus includes the estimation means, in a case where a time frame adjacent to the time frames, which can be reserved, excluding the time frames retrieved by the second search means is a reserved time frame, that estimates the probability based on a tendency of the other users to reserve time frames adjacent to the reserved time frame.

According to the present invention, in a case where a time frame adjacent to a time frame, which can be reserved, that is a candidate for a movement destination is a reserved time frame, based on the tendency of the another user for reserving a time frame adjacent to the reserved time frame, the probability of being able to be reserved is estimated. Accordingly, the tendency of another user of not desiring to use the time frame adjacent to a time frame used by other persons can be reflected on the presentation mode of the information of the two or more continuous time frames having a possibility of being able to be reserved.

The information processing apparatus,
wherein the place is an athletic facility, and
wherein the estimation means, in a case where a time frame immediately before the time frames, which can be reserved, excluding the time frames retrieved by the second search means is a reserved time frame, estimates the probability based on skills of players using the time frame immediately before the time frames.

In an athletic facility, in a case where the level of skills of a player who performs playing is low, there are cases where the progress of the game may be delayed. When the game is delayed, a player using a time frame immediately after that of the delayed game may wait for the game. Such a situation is not preferable for a player using the time frame immediately after that of the delayed game. According to the present invention, based on the skills of a player using a time frame immediately before a time frame, which can be reserved, that is a candidate for a movement destination, the probability of being able to be reserved is estimated. Accordingly, the preference of setting the time frame that can be reserved as the movement destination of the reserved time frame can be reflected on the presentation mode of the information of the two or more continuous time frames having a possibility of being able to be reserved.

The information processing apparatus includes the estimation means that estimates the probability based on a degree of easiness of movement from addresses of the other users to the place.

As the degree of easiness of movement from the address of another user to the used place becomes higher, there is a probability that the another user can easily perform the adjustment of schedules for moving the time frame. According to the present invention, based on the degree of easiness of movement from the address of another user to the used place, the probability of being able to be reserved is estimated. Accordingly, the burden of adjustment of schedules for moving the time frame can be reflected on the presentation mode of the information of the two or more continuous time frames having a possibility of being able to be reserved.

The information processing apparatus further includes a determination means that determines a privilege assigned to the other users who accept the movement of the reserved time frames included in the time frames that are retrieved by the second search means and are requested by the user and determines the privilege to have a higher value as the probability estimated by the estimation means decreases.

According to the present invention, the value of the privilege assigned to another user who has accepted the movement of the reserved time frame is determined based on the probability that two or more continuous time frames requested by the user can be reserved. Thus, according to the degree of difficulty of accepting the movement of the reserved time frame, another user who has accepted the movement of the reserved time frame can acquire the privilege.

The information processing apparatus further includes: a reservation request acquiring means that acquires a reservation request from the user that includes the time frames retrieved by the second search means as desired time frames;

a request notification outputting means that outputs a notification of a movement request of a time frame to the other users who have reserved the reserved time frames included in the desired time frames included in the reservation request acquired by the reservation request acquiring means;

an approval notification acquiring means that acquires a notification of approval for movement of the time frame from the other users; and a possible notification outputting means that, in a case where the notification of the approval is acquired by the approval notification acquiring means, outputs a notification indicating to the user that the desired time frames become time frames that can be reserved.

According to the present invention, in a case where a reservation for two or more continuous time frames having a possibility of being able to be reserved are requested, another user is notified of a time frame movement request. Accordingly, the movement of the reserved time frame can be promoted. In addition, in a case where another user accepts the movement of the time frame, securement of two or more continuous time frames that can be reserved is notified. Accordingly, two or more continuous time frames having a possibility of being able to be reserved can be reserved in an easy manner.

The information processing apparatus further includes:

a reservation request acquiring means that acquires a reservation request from the user that include the time frames retrieved by the second search means as desired time frames;

a time slot acquiring means that acquires a time slot accepted by the other users as a movement destination of the time frame; and an outputting means that, in a case where, in the time slot acquired by the time slot acquiring means, a range excluding the desired time frames included in the reservation request acquired by the reservation request acquiring means includes a time frame that can be reserved as a movement destination of the reserved time frame, outputs a notification indicating to the user that the desired time frames become time frames that can be reserved and outputs a notification indicating to the another user that the reserved time frame is moved.

According to the present invention, in a case where a reservation for two or more continuous time frames having a possibility of being able to be reserved are requested, in a case where a time slot accepted as a movement destination of the time frame reserved by another user includes a time frame that can be reserved as a movement destination, the user is notified of the securement of two or more continuous time frames that can be reserved. For this reason, two or more continuous time frames having a possibility of being able to be reserved can be easily reserved. In addition, the another user can notice that the time frame reserved by the another user has been moved.

According to an embodiment, there is provided an information processing method executed by a computer, the information processing method including:

a first search step of searching for two or more continuous time frames that can be reserved in response to a request from a user among a plurality of time frames set as use time frames of a place;

a second search step of searching for two or more continuous time frames including at least one reserved time frame in response to a request from the user and having a possibility of being able to be reserved as another user who has reserved the reserved time frames accepts movement of the reserved time frames; and a presentation control step of presenting a search result according to the first search means and a search result according to the second search means in modes distinguishable from each other.

According to an embodiment, there is provided an information processing program that causes a computer to serve as:

a first search means that searches for two or more continuous time frames that can be reserved in response to a request from a user among a plurality of time frames set as use time frames of a place;

a second search means that searches for two or more continuous time frames including at least one reserved time frame in response to a request from the user and having a possibility of being able to be reserved as another user who has reserved the reserved time frames accepts movement of the reserved time frames; and a presentation control means that presents a search result according to the first search means and a search result according to the second search means in modes distinguishable from each other.

Advantageous Effects of the Invention

According to the present invention, a result of a search for two or more continuous time frames having a possibility of being able to be reserved is presented in a mode distinguishable from a result of a search for two or more continuous time frames that can be reserved. Thus, the two or more continuous time frames can be reserved in an easy manner.

BRIEF DESCRIPTION OF THE DRAWINGS

FIG. 2A is a diagram that illustrates an example of a reservation status, FIG. 2B is a diagram that illustrates an example of continuous frames and a possibility of a reservation for the continuous frames, and FIG. 2C is a diagram that illustrates an example of factors influencing a reservation probability score and calculation criteria of the reservation probability score.

FIG. 4A is a diagram that illustrates an example of display of a time frame selection page, and FIG. 4B is a diagram that illustrates an example of display of the time frame selection page of a case where continuous frames that can be reserved at a current time point are not retrieved.

FIG. 7A is a diagram that illustrates an example of a content of the text of a time frame movement request mail, and FIG. 7B is a diagram that illustrates an example of display of a time frame movement approval page.

FIG. 8 is a block diagram that illustrates an example of the schematic configuration of a golf links reservation server 1 according to an embodiment.

FIG. 9A is a diagram that illustrates an example of a content registered in a member information DB 12a, FIG. 9B is a diagram that illustrates an example of a content registered in a golf links information DB 12b, FIG. 9C is a diagram that illustrates an example of a content registered in a reservation status DB 12c, FIG. 9D is a diagram that illustrates an example of a content registered in a reservation information DB 12d, FIG. 9E is a diagram that illustrates an example of a content set in group information, and FIG. 9F is a diagram that illustrates an example of a content registered in an operation history DB 12e.

FIG. 18 is a diagram that illustrates an example of a content registered in a reservation information DB 12d.

MODE FOR CARRYING OUT THE INVENTION

Hereinafter, embodiments of the present invention will be described in detail with reference to the drawings. The embodiments described below are embodiments of a case where the present invention is applied to an information processing system.

1. First Embodiment

[1-1. Overview of Configuration and Function of Information Processing System]

Figure 1:
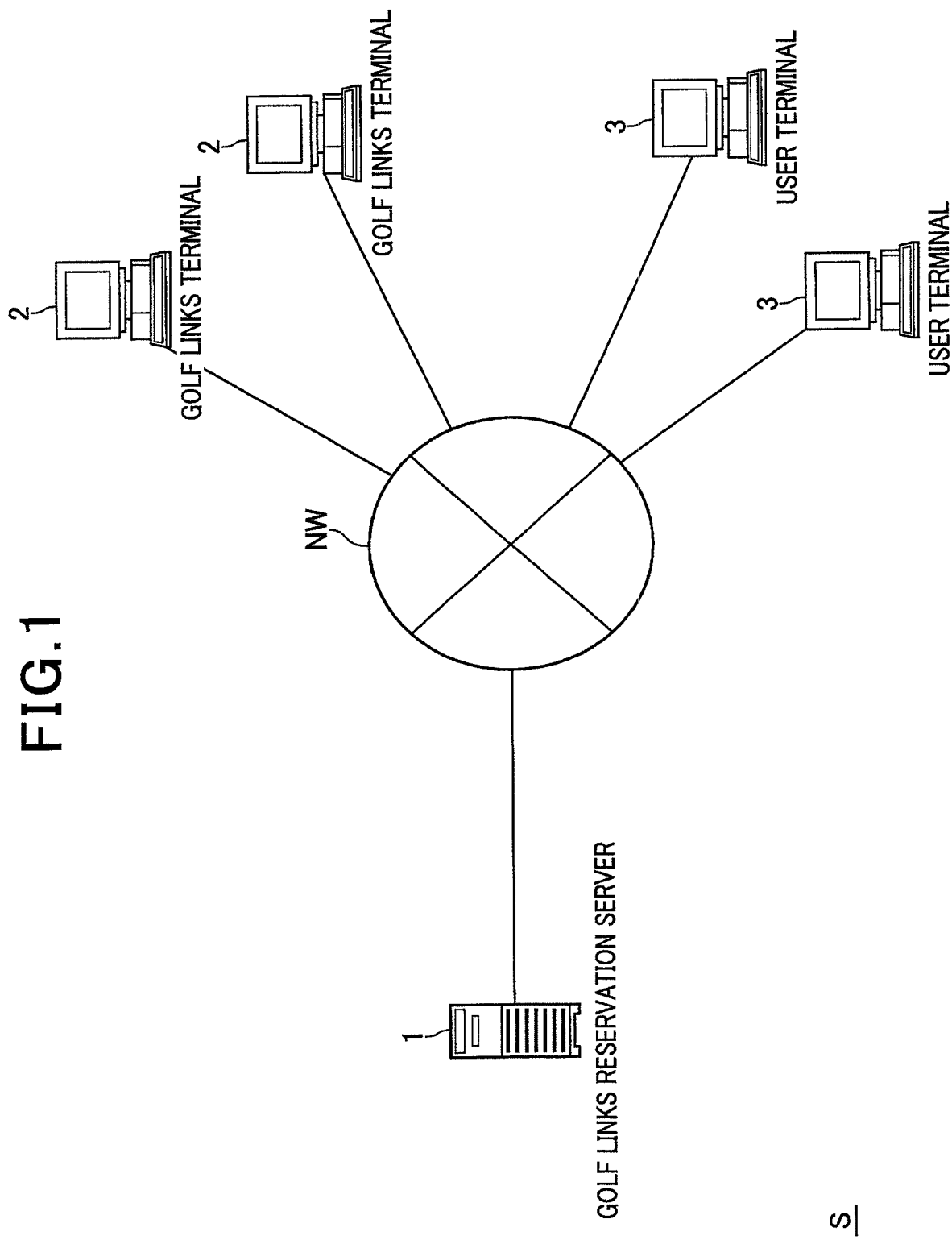
FIG. 1 is a diagram that illustrates an example of the schematic configuration of an information processing system S according to an embodiment.

First, the configuration of an information processing system S according to the present embodiment will be described with reference to FIG. 1. FIG. 1 is a diagram that illustrates an example of the schematic configuration of the information processing system S according to the present embodiment.

As illustrated in FIG. 1, the information processing system S is configured to include: a golf links reservation server 1; a plurality of golf links terminals 2; and a plurality of user terminals 3. The golf links reservation server 1, each golf links terminal 2, and each user terminal 3 are enabled to transmit/receive data to/from each other through a network NW, for example, using TCP/IP or the like as a communication protocol. The network NW, for example, is built by the Internet, a dedication communication line (for example, a CATV (Community Antenna Television) line), a mobile communication network (including a base station and the like), a gateway, and the like.

The golf links reservation server 1 is a server apparatus that executes various processes relating to a reservation site for reserving a golf links. The golf links reservation server 1 is an example of an information processing apparatus according to the present invention. A user can reserve a desired golf links by using the reservation site. The golf links is an example of a place according to the present invention. The golf links reservation server 1, for example, transmits a web page of the reservation site or executes processes relating to a search, a reservation, and the like a of golf links in response to a request from the user terminal 3.

The golf links terminal 2 is a terminal device that is used by a golf links provider providing golf links. The golf links terminal 2 accesses a server apparatus such as the golf links reservation server 1 based on an operation performed by the golf links provider. From this, the golf links terminal 2 receives a web page from the server apparatus and displays the received web page. In the golf links terminal 2, software such as a browser, an electronic mail client, and the like is embedded. The golf links provider uses the golf links terminal 2, thereby, for example checking a reservation status of golf links provided by the golf links provider or changing the reservation.

The user terminal 3 is a terminal device of a user using a reservation site. The user terminal 3 accesses the golf links reservation server 1 based on a user's operation, thereby receiving a web page from the golf links reservation server 1 and displaying the web page. In the user terminal 3, software such as a browser and an electronic mail client is embedded. As the user terminal 3, for example, a personal computer, a PDA (personal digital assistant), a mobile information terminal such as a smartphone, a mobile phone, or the like is used.

[1-2. Search for Continuous Frames]

[1-2-1. Overview]

Next, a search for a continuous frames in golf links will be described with reference to FIGS. 2 to 7. At a reservation site, in order for a user to reserve golf links, the user designates time at which a golf play is started. This time is called "start time". For each golf links, a plurality of start times are arranged. In addition, for each golf links, an interval of the start times is set. A period of time from certain start time to time immediately before the next start time will be referred to as a "time frame". The time frame according to the present embodiment is associated with a course of golf links. A user reserves a golf links and a course associated with a time frame that corresponds to designated start time. Then, it is scheduled to start a golf play in a range of the reserved time frame.

Here, the user may reserve two or more time frames. In such a case, two or more time frames that are continuous in time may be reserved. Two or more continuous time frames will be referred to as "continuous frames". The number of time frames configuring the continuous frames corresponds to the number of groups to play golf. One group starts a golf play in one time frame. The number of time frames configuring continuous frames will be referred to as a "time frame continuation number". In addition, continuous frames of which the time frame continuation number is n will be referred to as n continuous frames.

When a search for golf links is performed at a reservation site, a user can input various search conditions. The golf links reservation server 1 searches for golf links providing a plan that can be reserved under a designated search condition. Here, the plan is a service that includes provision of golf links. The plan, for example, is designed by a golf links provider. Examples of the search condition include a play date, a fee range, a region, a desired start time slot, designation/no-designation of continuous frames, a desired number of frames, and a golf links name. The play data is a date on which a golf play is performed at a golf links. The desired start time slot is a time slot in which the user desires to start the play. The desired start time slot, for example, may be designated by using a method of designating a nine o'clock unit or ten o'clock unit. Alternatively, the desired start time slot, for example, may be designated by using a method of designating 10 o'clock to 12 o'clock. In a case where there is no designation of continuous frames, the golf links reservation server 1 regards that one is designated as the number of the time frame. The desired frame number is a time frame continuation number desired by the user. As the search condition, for example, designation of two continuous frames starting from 7:00 may be allowed. In addition, as the search condition, designation of start time of 7:00 to start time of 7:21 may be allowed.

When golf links are retrieved, a golf links search result page is displayed on the screen of the user terminal 3. On the golf links search result page, as a result of the search for golf links, a list of retrieved golf links is displayed. When the user selects a desired golf links from among the list, a golf links page is displayed on the screen of the user terminal 3. On the golf links page, information relating to the selected golf links is displayed. In addition, on the golf links page, a list of plans of the selected golf links that satisfies the search condition is displayed. On the golf links page, when the user selects a combination of a plan and play date, the golf links reservation server 1 searches for a time frame that can be reserved for the selected combination. Here, the time frame that can be reserved is a time frame that has not been reserved for anyone. This time frame will be referred to as a "vacant frame". In addition, a time frame that has already been reserved will be referred to as a "reserved frame". A user who has reserved a reserved frame will be referred to as a "reservation-completed person". The reservation-completed person is an example of another user, who has reserved a reserved time frame, according to the present invention. In a case where continuous frames are designated in the search condition, the golf links reservation server 1 searches for the continuous frames that can be reserved as continuous frames corresponding to the number of time frames designated in the search condition. In addition, the user may select a date different from the play date designated as the search condition as play date.

When a time frame is retrieved, a time frame selection page is displayed on the screen of the user terminal 3. On the time frame selection page, as a result of the search for the time frame, a list of retrieved time frames is displayed. When the user selects a desired time frame, a reservation processing page is displayed on the screen of the user terminal 3. The reservation processing page is a web page that is used for a user to input various kinds of information required for the processing of a reservation. For example, the user inputs the number of players of each group playing in each time frame, information of members of each group, and the like. The user can reserve the selected time frame for the golf links, the plan, and the data, which have been selected, by performing the processing.

In a case where a continuous frame is designated as the search condition, when at least one reserved frame is present within the time frame represented by the continuous frames, the continuous frames cannot be reserved by the user. However, if the reserved frame can be moved to the outside of the time frame represented by the designated continuous frame, the continuous frames can be reserved by the user. Thus, when there is a possibility that the movement of the reserved frame is accepted by the reservation-completed person, there is a possibility that the continuous frames can be reserved. The possibility of a reservation for continuous frames is a possibility that the continuous frames can be reserved as the reservation-completed person accepts the movement of the reserved frame. The movement of the reserved frame corresponds to changing a reservation content.

In a case where there is no continuous frames that can be reserved at a current time point, on the time frame selection page, a message indicating that the continuous frames cannot be retrieved is displayed as a result of the search. In such a case, the user cannot reserve the continuous frames. In a case where the number of continuous frames that can be reserved at the current time point is small, retrieved time frames are displayed on the time frame selection page. However, in such a case, a user's option for the time frame is limited. Thus, in order to enable the user to easily reserve continuous frames, the golf links reservation server 1 searches for continuous frames having possibilities of a reservation. Then, the golf links reservation server 1 presents a result of the search for continuous frames that can be reserved at the current time point and a result of the search for continuous frames that have possibilities of a reservation in a mutually-distinguishable mode to the user through the user terminal 3. The distinguishable mode, for example, is a visually distinguishable mode. Here, the golf links reservation server 1 does not need to search for continuous frames having no possibility of a reservation. The reason for this is that, even when continuous frames having no possibility of a reservation are presented to the user, the continuous frames are considered not to be able to be reserved also in the future.

A vacant frame that becomes a candidate for a movement destination of a reserved frame included in the continuous frames designated by the user will be referred to as a "time frame of a movement destination candidate". The time frame that becomes a movement destination candidate is a vacant frame that is present within a time range other than the continuous frames to be secured. The range of the time frame that becomes a movement destination candidate is set such that a disadvantage of the reservation-completed person due to movement of the reserved frame is reduced as much as possible. More specifically, the time frame that becomes a movement destination candidate, for example, is a time frame in which golf links, a course, and a plan that are the same as those set in the reserved frame, which is the movement target, are set. Here, the plan may not be the same as the plan set in the reserved frame. In addition, in a case where the reserved frames that are the movement targets are continuous frames, the time frames that become the movement destination candidates, for example, are limited to time frames that are vacant continuously for the time frames corresponding to the time frame continuation number of the reserved frames. In addition, the time range that is a movement destination candidate, for example, is limited to a date on which the continuous frames to be secured are present. For example, in a case where the continuous frames to be secured are present on October 1, the time range of the movement destination candidates is on October 1 as well. Alternatively, the time range that becomes a movement destination candidate may be three days starting from a previous day of the date on which the continuous frames to be secured are present. For example, in a case where the continuous frames to be secured are on October 2, the time range of movement destination candidates is from October 1 to October 3. Alternatively, in a case where the continuous frame to be secured are on a holiday, the time range that becomes a movement destination candidate may be a range in which holidays are continuous. For example, in a case where Monday is a national holiday, and the continuous frames to be secured are present on Saturday, the time range of movement destination candidates is Saturday to Monday.

Hereinafter, a specific example of presence/no-presence of the possibility of a reservation will be described. FIG. 2A is a diagram that illustrates an example of a reservation status. For example, in an out course of a certain golf links, it is assumed that nine time frames per day are set. For the convenience of description, the number of the time frames is represented to be small. As illustrated in FIG. 2A, the earliest start time is 7:00. In addition, the time interval of start times is 7 minutes. Among the nine time frames, time frames respectively starting at 7:07, 7:28, 7:35, and 7:56 are reserved frames. In addition, the time frames starting at 7:28 and 7:35 are reserved by a user C as two continuous frames. For this, it is assumed that a user A wants to reserve four continuous frames. In such a case, four continuous frames that can be reserved at the current time point are not present. However, there are four continuous frames having a possibility of a reservation.

FIG. 2B is a diagram that illustrates an example of continuous frames and a possibility of a reservation for the continuous frames. For example, for four continuous frames starting at 7:00, as a movement destination candidate, there are time frames respectively starting at 7:42 and 7:49. For this reason, by moving the reserved frame starting at 7:07 to the time frame starting at 7:42 or 7:49, continuous frames that are vacant continuously for four frames can be secured. Accordingly, there is a possibility of a reservation. In such a case, a user B who has reserved the time frame starting at 7:07 needs to accept the movement of the time frame.

In addition, for example, for four continuous frames starting at 7:07, as a movement destination candidate, there are time frames respectively starting at 7:00, 7:42, and 7:49. For this reason, by moving the reserved frame starting at 7:07 to the time frame starting at 7:00 and moving the reserved frames starting at 7:28 as two continuous frames to the time frames starting at 7:42, continuous frames that are vacant continuously for four frames can be secured. Accordingly, there is a possibility of a reservation.

In addition, for example, for four continuous frames starting at 7:21, there are no time frames that are vacant for two continuous frames or more in a range other than the four continuous frames. For this reason, the reserved frames starting at 7:28 as two continuous frames cannot be moved. Accordingly, there is no possibility of a reservation.

[1-2-2. Overview of Process Up to Display of Time Frame Selection Page]

Figure 3:
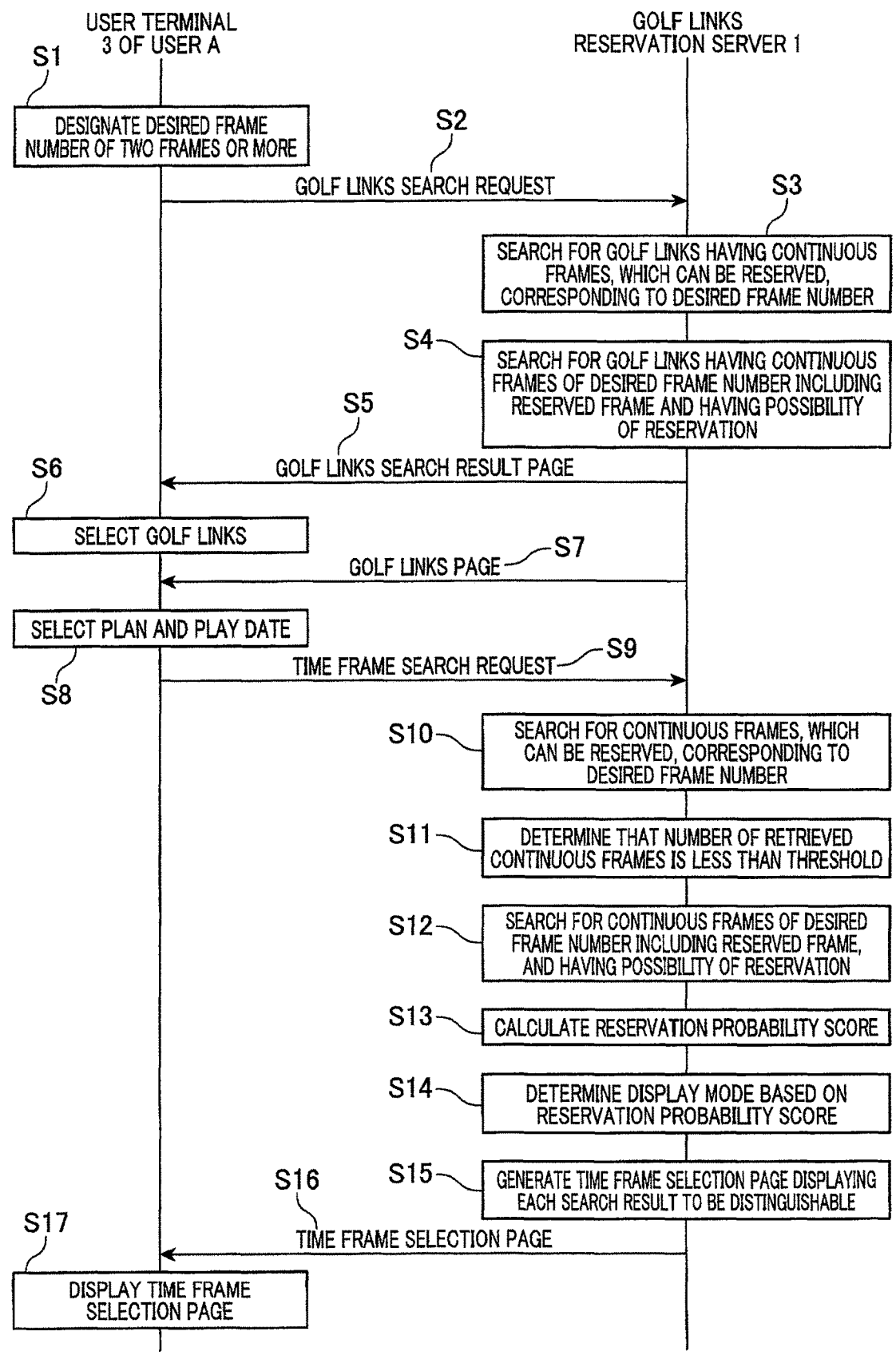
FIG. 3 is a sequence diagram that illustrates an overview of the process performed by an information processing system S according to an embodiment.

Next, an overview of the operation of the information processing system S will be described. FIG. 3 is a sequence diagram that illustrates an overview of the process performed by the information processing system S according to this embodiment. On the screen of the user terminal 3 used by the user A, a web page used for designating a search condition at the reservation site is displayed. For example, designation of a search condition on the top page can be performed. Thus, the user A designates the search condition. At this time, the user A, as illustrated in FIG. 3, is assumed to designate continuous frames and designate a value that is two or more as a desired frame number (step S1). Next, the user terminal 3 transmits a golf links search request based on an operation of the user A (step S2). The golf links search request is a message requesting a search for golf links. The golf links search request includes the search condition designated by the user.

The golf links reservation server 1 that has received the golf links search request searches for golf links and plans that satisfy the search condition included in the golf links search request. Then, the golf links reservation server 1 searches for a golf links and a plan having continuous frames, in which time frames that can be reserved corresponding to a desired number of frames designated by the user are continuous, among the golf links and the plans satisfying the search condition (step S3).

Next, the golf links reservation server 1 searches for golf links and plans having continuous time frames corresponding to the desired number of frames designed by the user, including at least one reserved frame, and having continuous frames having a possibility of a reservation among the golf links and the plans that satisfy the search condition (step S4). On the other hand, in a case where continuous frames are not designated as the search condition, the golf links reservation server 1 searches only for golf links and plans having a time frame that can be reserved.

Next, the golf links reservation server 1 generates a golf links search result page. The golf links reservation server 1 integrates a result of the search performed in step S3 and a result of the search performed in step S4. Accordingly, the golf links reservation server 1 generates a list of golf links each being at least one of a golf links having continuous frames that can be reserved and a golf links having continuous frames having a possibility of a reservation. Then, the golf links reservation server 1 generates a golf links search result page based on the generated list. The golf links reservation server 1 transmits the generated golf links search result page to the user terminal 3 of the user A (step S5).

The user terminal 3 displays the received golf links search result page. The user A selects a golf links from the list of the golf links displayed on the golf links result search page (step S6). Then, the golf links reservation server 1 transmits a golf links page to the user terminal 3 in response to the request from the user terminal 3 (step S7). When the golf links search page is received, the user terminal 3 displays the received golf links page. The user A selects a plan and a play date from a list of plans and a list of play dates displayed on the golf links page (step S8). Then, the user terminal 3 transmits a time frame search request to the golf links reservation server 1 (step S9). The time frame search request is a message requesting for a search for a time frame.

The golf links reservation server 1 that has received the time frame search request searches for continuous frames in which time frames that can be reserved corresponding to the desired number of frames designated as the search condition are continuous from the golf links, the plan, and the play date that have been selected by the user (step S10). Next, the golf links reservation server 1 counts the number of retrieved continuous frames. Then, the golf links reservation server 1 is assumed to determine that the number of the retrieved continuous frames is less than a threshold that is set in advance (step S11). In such a case, the golf links reservation server 1 searches for continuous frames having continuous time frames corresponding to the desired number of frames designated as the search condition, including at least one reserved frame, and having a possibility of a reservation from the golf links, the plan, and the play date that have been selected by the user (step S12). On the other hand, in a case where continuous frames are not designated as the search condition, the golf links reservation server 1 searches only for a time frame that can be reserved.

On the other hand, in a case where the number of retrieved continuous frames is the threshold or more, the golf links reservation server 1 does not search for continuous frames having a possibility of a reservation. The reason for this is that, since there is a user's option for a time frame, a search for continuous frames having a possibility of a reservation does not need to be performed. In addition, since the number of times of performing the searching process decreases, the processing load of the golf links reservation server 1 can be reduced. In this case, the golf links reservation server 1 transmits a time frame selection page displaying a result of the search for continuous frames in which time frames that can be reserved corresponding to the number of desired frames are continuous to the user terminal 3.

A supervisor of the golf links reservation server 1 can set the threshold. The threshold, for example, may be either one or two or more.

After step S12, the golf links reservation server 1 estimates a reservation probability for every continuous frames having a possibility of a reservation that have been retrieved in step S12 (step S13). Here, the reservation probability represents the degree of probability at which retrieved continuous frames having a possibility of a reservation can be reserved. A probability at which continuous frames can be reserved is the same as a probability at which all the reserved frames included in the continuous frames move to time frames other than those of the continuous frames. The golf links reservation server 1, for example, calculates a reservation probability score as information representing a reservation probability. Alternatively, the golf links reservation server 1, for example, may calculate a probability that represents the reservation probability. Next, the golf links reservation server 1 determines display modes of search results of continuous frames having possibilities of a reservation based on the reservation probability score (step S14). The display mode of the search result of continuous frames having a possibility of a reservation will be described later.

Next, the golf links reservation server 1 generates a time frame selection page such that the result of the search for continuous frames that can be reserved acquired in step S11 and the result of the search for continuous frames having a possibility of a reservation acquired in step S12 are displayed to be distinguishable from each other (step S15). At this time, the golf links reservation server 1 generates the time frame selection page such that the result of the search for continuous frames having possibilities of a reservation is displayed in the display mode determined in step S14. The golf links reservation server 1 transmits the generated time frame selection page to the user terminal 3 of the user A (step S16). The user terminal 3 of the user A displays the received time frame selection page (step S17).

[1-2-3. Content of Display of Time Frame Selection Page]

FIG. 4A is a diagram that illustrates an example of display of the time frame selection page. In addition, FIG. 4A illustrates an example in which a result of a search for five continuous frames is displayed. FIG. 4A illustrates an example of a case where the threshold is less than "4". As illustrated in FIG. 4A, the time frame selection page includes a search result area 100. In the search result area 100, a list of retrieved continuous frames is displayed. More specifically, in the search result area 100, continuous frame information 110 is displayed for every continuous frames. In the continuous frame information 110, a course name 111, reservation/no-reservation information 112, reservation probability information 113, continuous frames 114, and a reservation button 115 are displayed.

The reservation/no-reservation information 112 is information that represents whether or not a reservation can be made at the current time point. In a case where a reservation can be made, for example, "being able to be reserved" is displayed as the reservation/no-reservation information 112. On the other hand, in a case where a reservation cannot be made, for example, "not being able to be reserved" is displayed as the reservation/no-reservation information 112. As the reservation/no-reservation information 112 is displayed, the user can distinguish a result of the search for continuous frames that can be reserved at the current point and a result of the search for continuous frames that cannot be reserved at the current time point but has a possibility of a reservation from each other. In the example illustrated in FIG. 4A, for example, for five continuous frames starting from 10:30, "being able to be reserved" is displayed as the reservation/no-reservation information 112. Accordingly, the user can reserve the five continuous frames starting from 10:30 at the current time point. On the other hand, for five continuous frames starting from 12:12, "not being able to be reserved" is displayed as the reservation/no-reservation information 112. Thus, the user cannot reserve the five continuous frames starting from 12:12 at the current time point. Here, information displayed as the reservation/no-reservation information 112 may not be "being able to be reserved" and "not being able to be reserved". The reservation/no-reservation information 112 may be information that enables the user to distinguish between results of the searches.

The display mode enabling a result of the search for continuous frames that can be reserved at the current time point and a result of the search for continuous frames that cannot be reserved at the current time point but has a possibility of a reservation to be distinguishable from each other is not limited to the display mode using the reservation/no-reservation information 112 illustrated in FIG. 4A. For example, the golf links reservation server 1 may generate the time frame selection page such that, in the continuous frame information 110 of a continuous frames that cannot be reserved at the current time point, the number of reserved frames included in continuous frames is displayed. In addition, the golf links reservation server 1 may generate the time frame selection page such that at least one of a background color of the area, a size of the area, a color of characters, a size of the characters, and a style of the characters is different between the continuous frame information 110 of continuous frames that can be reserved at the current time point and the continuous frame information 110 of continuous frames that cannot be reserved at the current time point. At this time, the golf links reservation server 1 may generate the time frame selection page such that the display mode of the continuous frame information 110 of continuous frames that can be reserved at the current time point is a display mode that can be visually recognized more easily than the display mode of the continuous frame information 110 of continuous frames that cannot be reserved at the current time point. In addition, the golf links reservation server 1 may generate the time frame selection page such that a result of the search for continuous frames that can be reserved at the current time point and a result of the search for continuous frames that cannot be reserved at the current time point are displayed in mutually-different areas. Furthermore, the golf links reservation server 1 may display a tab corresponding to continuous frames that can be reserved at the current time point and a tab corresponding to continuous frames that cannot be reserved at the current time point on the time frame selection page to be distinguishable from each other. Then, the golf links reservation server 1 may generate the time frame selection page such that a result of a search for continuous frames corresponding to a tab selected and operated by the user is displayed. An element that is a target to be selected and operated is not limited to the tab. The element to be selected and operated, for example, may be a radio button, a list box, or the like.

The reservation probability information 113 is information representing a probability that continuous frames that cannot be reserved at the current time point becomes able to be reserved. For example, as the reservation probability information 113, one mark of "A", "B", and "C" is displayed. Among such marks, "A" represents a highest reservation probability. Then, the reservation probability decrease in order of "B" and "C". In the example illustrated in FIG. 4A, the display mode determined by the golf links reservation server 1 in step S14 is a mark to be displayed among "A", "B", and "C". By displaying the reservation probability information 113, the degrees of reservation probability of continuous frames can be recognized. In the example illustrated in FIG. 4A, for example, for five continuous frames starting from 12:12, "C" is displayed as the reservation probability information 113. Accordingly, the reservation probability of the five continuous frames starting from 12:12 is considered to be low. Here, the information displayed as the reservation probability information 113 many not be "A", "B", and "C". Thus, the above-described information may be any information that enables the user to distinguish the search results from each other.

Changing the display mode based on the reservation probability of the search result of continuous frames that cannot be reserved at the current time point is not limited to changing the mark as the reservation probability information 113 illustrated in FIG. 4A. For example, in a case where a probability representing a reservation probability is calculated in step S13, the golf links reservation server 1 may generate the time frame selection page such that the calculated probability is displayed in the continuous frame information 110. In addition, the golf links reservation server 1 may determine the display ranking of continuous frames based on the reservation probability score. Here, the display ranking is a ranking at which the continuous frame information 110 is displayed in the search result area 100. As the display ranking of continuous frames is higher, the corresponding continuous frame information 110 is displayed on the upper side. For example, the golf links reservation server 1 sets the display ranking to be higher as the reservation probability score of the continuous frames is higher. In addition, the golf links reservation server 1, for example, sets a display ranking of continuous frames that cannot be reserved at the current time point to be lower than the display ranking of continuous frames that can be reserved at the current time point. Furthermore, the golf links reservation server 1 may generate the time frame selection page such that the continuous frame information 110 of continuous frames of which the reservation probability score is a predetermined threshold or less is not displayed. The continuous frames of which the reservation probability is the predetermined value or less is considered to have no reservation possibility or have a low reservation probability. In addition, the golf links reservation server 1 may generate the time frame selection page such that the continuous frame information 110 is displayed only for continuous frames up to a predetermined number in order of a highest to lowest reservation probability score.

In addition, the golf links reservation server 1 may not perform calculation of the reservation probability score and control of the display mode based on the reservation probability score. At least a result of the search for continuous frames that can be reserved at the current time point and a result of the search for continuous frames that cannot be reserved at the time current point but has a possibility of a reservation may be displayed to be distinguishable from each other.

The continuous frame 114 is information that illustrates continuous frames. As the continuous frame 114, for example, start time of a first time frame of the continuous frames and start time of a last time frame of the continuous frames are displayed. As the continuous frame 114, for example, only start time of the first time frame of the continuous frames may be displayed. In addition, start time of each time frame configuring the continuous frames may be displayed.

The reservation button 115 is a button that is used for reserving continuous frames. When the user selects the reservation button 115, a web page used for processing the reservation is displayed. In a case where the user performs processing of a reservation for continuous frames that can be reserved at the current time point, the continuous frames are reserved at a time point when the processing is completed. On the other hand, in a case where the user performs processing of the reservation for continuous frames that cannot be reserved at the current time point, the continuous frames are not reserved at a time point when the processing is completed. In such a case, all the reserved frames included in the continuous frames selected by the user are moved, the continuous frames become continuous frames that can be reserved, and then, the continuous frames are reserved.

FIG. 4B is a diagram that illustrates an example of display of the time frame selection page of a case where continuous frames that can be reserved at a current time point are not retrieved. As illustrated in FIG. 4B, on the time frame selection page, a message 120 and a search result area 100 are displayed. The message 120 is a message indicating that continuous frames cannot be retrieved as a result of the search for continuous frames that can be reserved. For example, as the message 120, "There are no five continuous time frames that can be reserved." may be displayed. In the search result area 100, only a result of a search for continuous frames that cannot be reserved but have a possibility of a reservation is displayed. By displaying the message 120 and the search result area 100, the user can distinguish the result of the search for continuous frames that can be reserved at the current time point and the result of the search for continuous frames that cannot be reserved at the current time point but have a possibility of a reservation from each other.

In addition, in a case where the number of continuous frames that can be reserved at the current time point is the threshold or more, or in a case where there are continuous frames that cannot be reserved at the current time point and there are no continuous frames having a possibility of a reservation, only the result of the search for continuous frames that can be reserved at the current time point is displayed in the search result area 100. At this time, for the result of the search for continuous frames that cannot be reserved at the current time point but have a possibility of a reservation, a special message may not be displayed.

Figure 5:
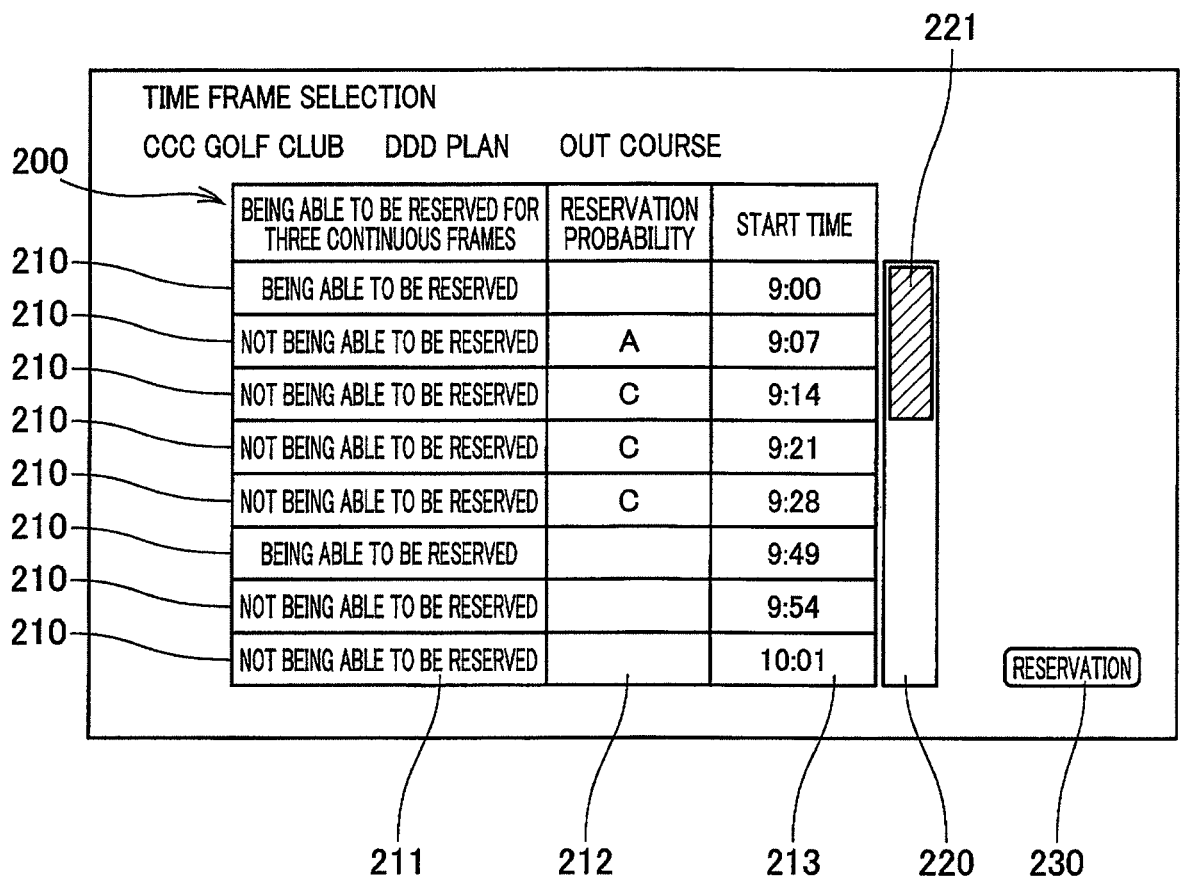
FIG. 5 is a diagram that illustrates another example of display of the time frame selection page.

FIG. 5 is a diagram that illustrates another example of display of the time frame selection page. The example illustrated in FIG. 5 is an example in which a time frame included in at least one of continuous frames that can be reserved at the current time point and continuous frames that cannot be reserved at the current time but have a possibility of a reservation is displayed for each frame. In addition, FIG. 5 illustrates an example in which a result of a search for three continuous frames is displayed.

As illustrated in FIG. 5, in the time frame selection page, a search result area 200, a slide bar 220, and a reservation button 230 are displayed. In the search result area 200, time frame information 210 is displayed for each retrieved time frame. In the time frame information 210, reservation/no-reservation information 211, reservation probability information 212, and a time frame 213 are displayed.

The reservation/no-reservation information 211 is information that represents whether or not continuous frames of a case where a time frame corresponding to the time frame information 210 is set as a first time frame of the continuous frames can be reserved at the current time point. The content of the reservation/no-reservation information 211 is the same as that of the reservation/no-reservation information 112. In the example illustrated in FIG. 5, for example, for a time frame starting from 9:00, "being able to be reserved" is displayed. Thus, the user can reserve three continuous frames starting from 9:00 at the current time point. For example, for a time frame starting from 9:07, "not being able to be reserved" is displayed. Thus, the user cannot reserve three continuous frames starting from 9:07 at the current time point.

The reservation probability information 212 is information that represents a probability that continuous frames that cannot be reserved at the current time point become able to be reserved in a case where a time frame corresponding to the time frame information 210 is set as a first time frame of the continuous frames. The content of the reservation probability information 212 is the same as that of the reservation probability information 113. In the example illustrated in FIG. 5, for example, for a time frame starting from 9:07, "A" is displayed. Thus, the reservation probability of three continuous frames starting from 9:07 is considered to be high. As the time frame 213, for example, start time of the time frame is displayed.

The slide bar 220 is used for selecting continuous frames. The slide bar 220 includes a knob 221. The height of the knob 221 corresponds to the height of the time frame information 210 that corresponds to a desired number of frames designated in the search condition. The user can vertically move the knob 221. Accordingly, the user can select time frames corresponding to a time frame continuation number corresponding to the position of the knob 221 as continuous frames. In the example illustrated in FIG. 5, a state is formed in which three continuous frames start from 9:00 are selected.

When the user moves the knob 221, the degree of easiness of user's moving the knob 221 changes according to whether or not continuous frames of a movement destination can be reserved at the current time point and the reservation probability of the continues frames of the movement destination. More specifically, in a case where continuous frames of the movement destination can be reserved at the current time point, the user can smoothly move the knob 221. On the other hand, in a case where the continuous frames of the movement destination cannot be reserved at the current time point, the user can move the knob 221 less smoothly than a case where the continuous frames of the movement destination can be reserved at the current time point. For example, in a case where an amount of a user's movement operation of the knob 221 is less than a predetermined value, the knob 221 may be slightly moved in the direction of the operation and be immediately returned to the original position. Then, in a case where an amount of the user's movement operation of the knob 221 is the predetermined value or more, the knob 221 may be moved to a continuous frame of the movement destination. In a case where the continuous frames of the movement destination cannot be reserved at the current time point, the lower the possibility of a reservation for the continuous frames of the movement destination is, the less the user can smoothly move the knob 221. Such a behavior of the knob 221, for example, is controlled by a script described in an HTML (HyperText Markup Language) document of the time frame selection page.

The reservation button 115 is a button used for reserving the continuous frames that are currently selected by the knob 221.

[1-2-4. Calculation Criteria of Reservation Probability Score]

Next, the calculation criteria of the reservation probability score will be described. FIG. 2C is a diagram that illustrates an example of factors influencing the reservation probability score and calculation criteria of the reservation probability score. Hereinafter, each factor influencing the reservation probability score will be described. The golf links reservation server 1, for example, may calculate the reservation probability score based on all the factors 1 to 10 described below or calculate the reservation probability score based on some of the factors.

(Factor 1) Number of Reserved Frames

In a case where reserved frames included in continuous frames that are targets are moved, reservation-completed persons who have reserved the reserved frames need to adjust the schedules of golf plays corresponding to the reserved frames to be moved. Accordingly, the larger the number of reserved frames is, the more time is required for the adjustment of the schedules. Thus, the larger the number of the reserved frames is, the probability that the reservation-completed persons accept the movement of the reserved frames is considered to be further lowered. Accordingly, the golf links reservation server 1 sets the reservation probability score to be lower as the number of reserved frames included in the continuous frames that are the targets increases. For example, in the example illustrated in FIG. 2A, it is assumed that three continuous frames are designated as the search condition. Here, in three continuous frames starting from 7:00, the number of reserved frames is one. In three continuous frames starting from 7:21, the number of reserved frames is two. Accordingly, the three continuous frames starting from 7:00 has a reservation probability score higher than the three continuous frames starting from 7:21.

(Factor 2) Number of Members Playing in Reserved Frame

In a case where reserved frames included in continuous frames that are targets are moved, reservation-completed persons who have reserved the reserved frames need to adjust schedules with members of groups playing golf in the reserved frames. Thus, as the number of the members increases, a more time is required for the adjustment of the schedules. For this reason, the larger the number of members is, the probability that the movement of the reserved frames is accepted by the reservation-completed persons is considered to be lower. Accordingly, the golf links reservation server 1 sets the reservation probability score to be lower as the number of members of the groups playing golf in the reserved frames included in the continuous frames that are the targets increases. For example, the golf links reservation server 1 sums the number of members of all the reserved frames included in the continuous frames that are the targets and sets the reservation probability score to be lower as the number of the members increases. For example, in the example illustrated in FIG. 2A, in the three continuous frames starting from 7:00, a sum of players is four. In the three continuous frames starting from 7:21, a sum of players is eight. In addition, in the three continuous frames starting from 7:42, a sum of players is two. Accordingly, the reservation probability score of the three continuous frames starting from 7:42 is the highest, and the reservation probability score of the three continuous frames starting from 7:21 is the lowest.

(Factor 3) Number of Reservation-Completed Persons (Number of Groups of Reservation)

It cannot be determined that all of one or more reserved frames included in the continuous frames that are targets are reserved by one reservation-completed person. There are cases where parts of one or more reserved frames have been reserved by different reservation-completed persons. The number of reservation-completed persons corresponds to the number of groups playing golf in one or more reserved frames included in the continuous frames that are the targets. In a case where all the reserved frames included in the continuous frames that are the targets are moved, the adjustment of the schedules is necessary for each group. The continuous frames that are the targets cannot be secured as vacant frames unless all the reservation-completed persons adjust the schedules, and all the reservation-completed persons accept the movement of the reserved frames. In a case where a probability that the movement of the reserved frames is accepted is considered to be calculated for each of reservation-completed persons, the reservation probability is a multiplication of probabilities of the acceptance of the movement of reserved frames that is performed by the reservation-completed persons. For this reason, the larger the number of reservation-completed persons is, the probability that the movement of the reserved frames is accepted by all the reservation-completed persons is considered to be lower. Accordingly, the golf links reservation server 1 sets the reservation probability score to be lower as the number of reservation-completed persons who have reserved the reserved frames included in the continuous frames that are the targets increases. For example, in the example illustrated in FIG. 2A, in four continuous frames starting from 7:07, the number of reservation-completed persons is two. In addition, in four continuous frames starting from 7:21, the number of reservation-completed persons is one. Accordingly, the reservation probability score of the four continuous frames starting from 7:21 is higher than that of the four continuous frames starting from 7:07.

(Factor 4) Movement Width of Reserved Frame

In a case where reserved frames included in continuous frames that are targets are moved, the longer the movement width is, a change in the schedules increases. For this reason, a more time is required for the adjustment of the schedules. Accordingly, the golf links reservation server 1 sets the reservation probability score to be lower as the movement width from the reserved frame included in the continuous frames that are the targets to a time frame of a movement destination candidate increases. In a case where there are a plurality of time frames of movement destination candidates, the golf links reservation server 1, for example, may calculate the reservation probability score based on a movement width for a time frame of a movement destination candidate having a shortest movement width from the reserved frame.

(Factor 5) Time Required for Reservation of Reserved Frame

For example, there are cases where a user ponders upon a selection of a golf links and a plan from a result of retrieved golf links or ponders upon a selection of a time frame from retrieved time frames. In such a case, a time required until a reservation is performed after user's start of a search for golf links increases. This time will be referred to as a "reservation required time". There is a high probability that a time frame selected as a reservation target as a result of user's pondering is selected as a result of careful consideration. Thus, a possibility that the movement of the time frame selected as a result of the careful consideration is accepted by the user is considered to be low. Thus, the golf links reservation server 1, for reservation-completed persons who have reserved the reserved frames included in continuous frames that are the targets, sets the reservation probability score to be lower as the reservation required time from an operation of a first search for golf links to a reservation for the reserved frame increases. The golf links reservation server 1, for example, may regard a user's first operation requesting for a search after logging into a golf links reservation site as a first search that is used for calculating the reservation required time. In addition, in a case where there is no user's operation performed for a golf links reservation site for a predetermined time or more, the golf links reservation server 1 may regard the user to have quit the use of the golf links reservation site. Then, the golf links reservation server 1 may regard a user's first operation for requesting for a search after no presence of user's operation for the golf links reservation site for a predetermined time or more as a first search that is used for calculating the reservation required time.

(Factor 6) Number of Searches.

As a result of a search performed by the golf links reservation server 1 by a user designating a certain search condition, in a case where a golf links, a plan, and a time frame, which are desired by the user, are not present in golf links, plans, and time frames that have been retrieved, there are cases where the user designates a different search condition and requests a search again. In a case where the user changes the search condition and requests for a search many times, there is a probability that the user ponders upon a selection of a golf links, a plan, and a time frame. Accordingly, there is a high probability that the time frame selected by the user after performing of the search many times is selected as a result of careful consideration. Accordingly, the golf/links reservation server 1, for reservation-completed persons who have reserved the reserved frames included in continuous frames that are targets, sets the reservation probability score to be lower as the number of searches from the first operation of the search for the golf links to the reservation for the reserved frame increases.

(Factor 7) Desired Start Time Slot as Search Condition

In a case where a user designates a desired start time slot as a search condition, there is a high probability that the user desires to start a play within a range of the designated time slot. For this reason, the probability that a reservation-completed person accepts the movement of a time frame to the desired start time slot is higher than the probability that a reservation-completed person accepts the movement of a time frame to a time slot other than the desired start time slot. Thus, in a case where the time frame of a movement destination candidate is included in the desired start time slot, the golf links reservation server 1 sets the reservation probability score to be higher than that of a case where the time frame of a movement destination candidate is not included in the desired start time slot.

(Factor 8) Tendency of Time Slot Reserved by Reservation-Completed Person

There are cases where a tendency of a time slot reserved by the user is present for each user. For example, it is assumed that a reservation-completed person tends to reserve a time frame between 5:00 to 7:00. In such a case, in a case where the time frame of the movement destination candidate is between 5:00 to 7:00, the probability that the reservation-completed person accepts the movement of the reserved frame is higher than that of a case where the time frame of the movement destination candidate is in a different time slot. Thus, in a case where the time frame of the movement destination candidate is included in the time slot that the reservation-completed person tends to reserve, the golf links reservation server 1 sets the reservation probability score to be higher than that of a case where the time frame of the movement destination candidate is not included in the time slot that the reservation-completed person tends to reserve. The user's tendency of the reservation can be determined based on the reservation history that represents a reservation result of the past.

(Factor 9) Tendency of Reservation-Completed Person for Reserving Time Frame Immediately after Reserved Frame of Other Person Among users, there are users who do not like to play golf in a group immediately after the group of other persons. Based on a result of a search for time frames that can be reserved at the current time point, which is displayed on the time frame selection page, the user can recognize a reserved time frame as a time frame immediately before a specific time frame. For this reason, a user who does not like to play golf in a group immediately after the group of other persons does not reserve a time frame immediately after a reserved frame of the other persons. Thus, in a case where the reservation-completed person tends not to reserve a time frame immediately after a reserved frame of the other person and in a case where there is no time slot having a vacant time frame as its prior time frame within the time frame of the movement destination candidate, the golf links reservation server 1 sets the reservation probability score to be higher than that of a case where there is a time slot having a vacant frame as its prior time frame.

In addition, in a case where the reservation-completed person tends not to reserve a time frame that is immediately before a reserved frame of the other persons and in a case where there is no time slot having a vacant time frame as its prior time frame within the time frame of the movement destination candidate, the golf links reservation server 1 may set the reservation probability score to be higher than that of a case where there is a time slot having a vacant frame as its prior time frame. The reason for this is that there may be users who do not like to play golf in a group immediately before a group of other persons. Here, a time frame immediately before a specific time frame and a time frame immediately after a specific time frame are examples of adjacent time frames.

(Factor 10) Golf Skills of Members Playing Golf in Reserved Frame of Other Persons The speed of the progress of a golf play may change depending on golf skills of players. More specifically, the progress of the play tends to be delayed as the level of the skill of a player is lower. In a case where a group having a high level of skills plays golf immediately after a group having a player who is not good at playing golf, the play of the previous group is delayed, and accordingly, the group having a high level of skills may wait for the play. There are many users who do not want to confront with such a situation. Accordingly, it is considered that a time frame immediately after a reserved frame, in which a group having a member who is not good at playing golf plays golf, is not preferably set as a movement destination candidate. Thus, in a case where a time frame immediately before a time frame of a movement destination candidate is a reserved frame and in a case where the level of skills of the members playing golf in the reserved frame is low, the golf links reservation server 1 sets the reservation probability score to be lower than that of a case where the level of skills of the members playing golf in the reserved frame is not low. For example, the golf links reservation server 1 may set the reservation probability score to be low in a case where the level of skills of at least one member is low. The reason for this that, in a case where at least one member having a low level of skills is present, there is a probability that the progress of the play is delayed.

In addition, in a case where the level of skills of members playing in a time frame immediately before a time frame of a movement destination candidate is low and in a case where the level of skills of the members playing in the reserved frame to be moved is high, the golf links reservation server 1 may set the reservation probability score to be low. Whether the level of skills is low or not and whether there are various skills or not can be determined by comparing a value representing each skill with a threshold. A threshold used for determining whether or not the level of skills is low and a threshold used for determining whether or not there are various skills may be configured to be different from each other.

For example, at a golf links reservation site, as information that represents the golf skills, each user may register his handicap. In addition, when a golf links is reserved, the user can designate the number of players of each group and members of each group. In a case where a designated member is a member of the golf links site, the golf links reservation server 1 can acquire a handicap of the member. In addition, when the golf links is reserved, it may be configured such that the handicap of each member can be input by the user. Alternatively, after the user plays golf at the golf links reserved at the golf links site, the score of the play of each member may be configured to be registered at the golf links site. In such a case, the golf links reservation server 1 can calculate the handicap based on the registered scores.

(Factor 11) Degree of Easiness of Movement from Address of Reservation-Completed Person to Golf Links In a case where the address of a user and a golf links are closely located, even when the schedule of the play is changed, there is a probability that the user can easily respond to a change in the schedule. Thus, the golf links reservation server 1 sets the reservation probability score to be higher as the movement from the address of the reservation-completed person to the golf links becomes easier. The easiness of the movement, for example, may be represented by a linear distance between the address of the user to the golf links, a movement distance, a movement time, and the like.

Among Factors 1 to 11, Factors 1 to 3 are reservation statuses within the continuous frames that are targets or contents of reservations. Factors 5 and 6 are the degrees of pondering until the reservation-completed person reaches a reservation. Factors 8 and 9 are reservation tendencies of the reservation-completed person. Factors 1, 2, 4, and 11 are the degrees of burden of the adjustment of schedules.

[1-2-5. Reservation of Continuous Frames Having Possibility of Reservation]

Even when continuous frames having a possibility of a reservation is displayed on the time frame selection page, if a reservation-completed person who has reserved a reserved frame included in the continuous frames does not actually accept the movement of the reserved frame, the continuous frames cannot be reserved. Thus, for allowing an easy reservation for the continuous frames having a possibility of a reservation, the golf links reservation server 1 performs notification for the reservation-completed person.

Figure 6:
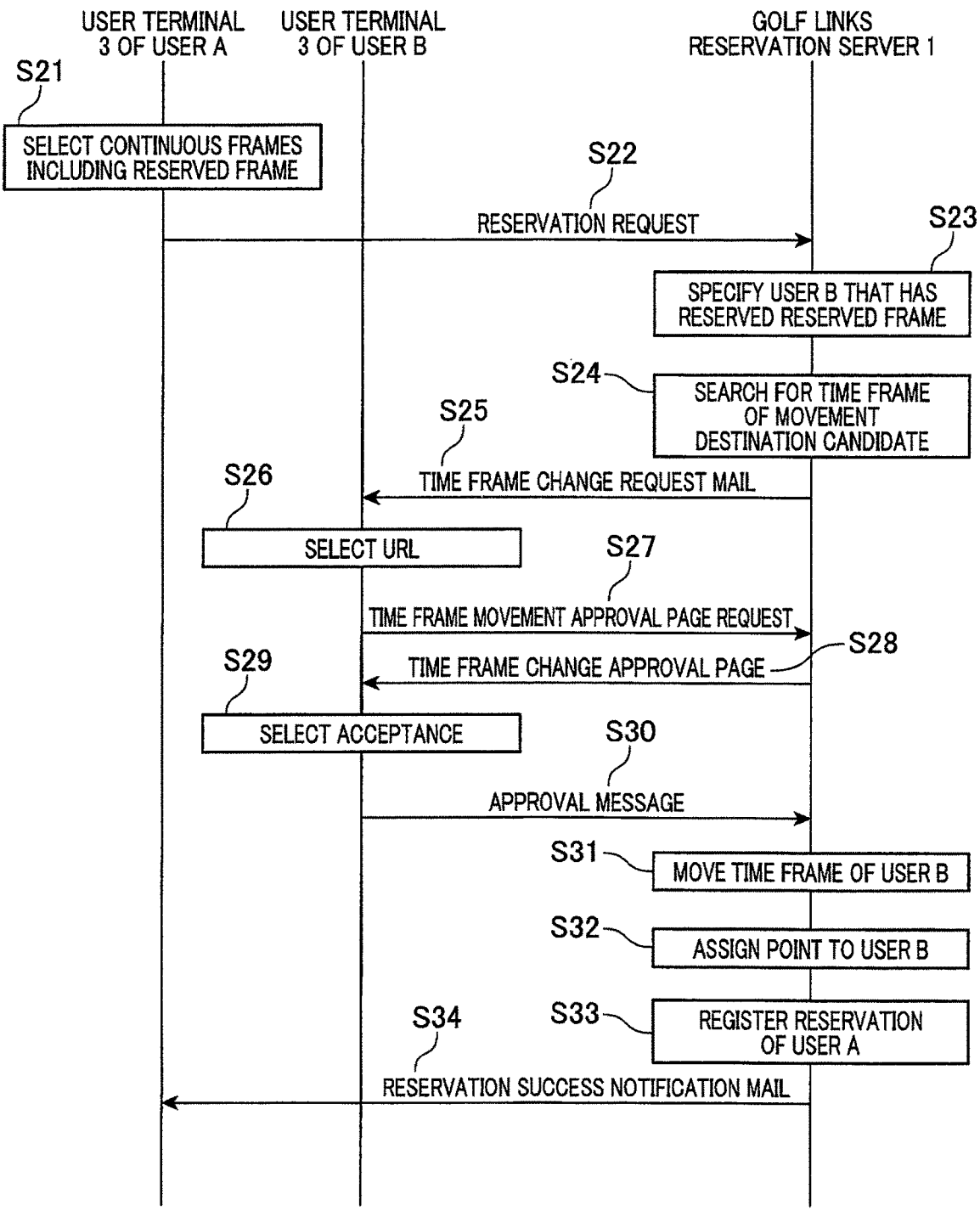
FIG. 6 is a sequence diagram that illustrates schematic processing of an information processing system S according to an embodiment.

FIG. 6 is a sequence diagram that illustrates schematic processing of the information processing system S according to the present embodiment. It is assumed that the time frame selection page is displayed in the user terminal 3 of the user A through the process illustrated in FIG. 3. Here, the user A, as illustrated in FIG. 6, selects the reservation button 115 corresponding to continuous frames including a reserved frame as continuous frames desired to be reserved from the time frame selection page (step S21). Then, the reservation processing page is displayed in the user terminal 3. When the user A inputs necessary information, the user terminal 3 transmits a reservation request to the golf links reservation server 1 (step S22). The reservation request is a message that represents a request for a reservation. The reservation request is an example of a reservation request according to the present invention. A user using the user terminal 3 that transmits a reservation request will be referred to as a "reservation requester".

The golf links reservation server 1 that has received the reservation request specifies a reservation-completed person who has reserved a reserved frame included in the continuous frames selected by the user A (step S23). Here, it is assumed that the user B is specified as the reservation-completed person. The golf links reservation server 1 searches for a time frame that is a movement destination candidate for the reserved frame reserved by the user B (step S24). In a case where the user B has reserved the reserved frame as continuous frames, the golf links reservation server 1 searches for continuous frames that are movement destination candidates. Then, the golf links reservation server 1 transmits a time frame movement request mail to the user B (step S25). The time frame movement request mail is an electronic mail that performs notification of a request for moving a reserved frame. The time frame movement request mail is an example of a notification of a time frame movement request according to the present invention.

FIG. 7A is a diagram that illustrates an example of a content of the text of the time frame movement request mail. As illustrated in FIG. 7A, in the time frame movement request mail, for example, a message representing presence of a time frame movement request is written. In addition, in the time frame movement request mail, a content of a current reservation, start time of a time frame of a movement destination candidate, and a URL (Uniform Resource Locator) of a time frame movement approval page are written. The time frame movement approval page is a web page that is used for selecting an approval of the movement of the time frame. In addition, in the time frame movement request mail, a message presenting that a point is given to a user who accepts the movement of a time frame is displayed. Here, the point has a value equal to money in a case where a user reserves a golf links at the golf links reservation site and can be applied as a reservation fee. By giving the point to a user who has accepted the movement of a time frame, an approval for the movement of the time frame can be promoted. The point is an example of a privilege that is given to a user according to the present invention. However, the privilege is not limited to the point. For example, the privilege may be a cash, an electronic cash, a discount coupon for a reservation fee, or the like. The provision of the privilege is arbitrary.

The user B selects the URL written in the time frame movement request mail that is displayed in the user terminal 3 (step S26). Then, the user terminal 3 of the user B transmits a request for a time frame movement approval page (step S27). The golf links reservation server 1 that has received the request for a time frame movement approval page generates the time frame movement approval page. At this time, the golf links reservation server 1 generates the time frame movement approval page such that the time frame of the movement destination candidate that is retrieved in step S24 can be selected as the time frame of the movement destination. Then, the golf links reservation server 1 transmits the time frame movement approval page (step S28).

The user terminal 3 of the user B displays the received time frame movement approval page. FIG. 7B is a diagram that illustrates an example of display of the time frame movement approval page. As illustrated in FIG. 7B, on the time frame movement approval page, a movement destination candidate area 310, an approval button 320, and a disapproval button 330 are displayed. In the movement destination candidate area 310, a list of start times of time frames of the movement destination candidates is displayed. In addition, in the movement destination candidate area 310, a radio button is displayed for each time frame of the movement destination candidate. The user B can select a time frame of the movement destination by performing a selection operation of the radio button.

The approval button 320 is a button that is used for a notification of user's acceptance of the movement of the time frame. The disapproval button 330 is a button that is used for a notification of user's no acceptance of the movement of the time frame.

When the user B selects a time frame using a radio button and selects the approval button 320 (step S29), the user terminal 3 transmits an approval message to the golf links reservation server 1 (step S30). The approval message is a message used for user's notification of the acceptance of the movement of the time frame. The approval message is an example of a notification of acceptance of movement of a time frame according to the present invention.

The golf links reservation server 1 that has received the approval message changes the reservation. More specifically, the golf links reservation server 1 moves the reserved frame of the user B included in the continuous frames selected by the user A to the time frame of the movement destination candidate selected by the user B (step S31).

Thereafter, the golf links reservation server 1 performs a process of giving a point to the user B (step S32). At this time, the golf links reservation server 1 determines the quantity of points to be given. For example, the golf links reservation server 1 may increase the quantity of points to be given as the reservation probability score decreases. In other words, the quantity of points is larger as the probability of the acceptance of the movement of the time frame, which is performed by the reservation-completed person, decreases. In addition, the golf links reservation server 1 may increase the quantity of points to be given as the time width from the time frame of a movement source to the time frame of a movement destination increases. The reason for this is that, the larger the time width is, the more difficult the adjustment of schedules is. Alternatively, the golf links reservation server 1, for example, may give a quantity of points that is determined in advance.

Next, when the continuous frames selected by the user A become continuous frames that can be reserved according to the movement of the time frame, the golf links reservation server 1 registers the reservation from the user A for the continuous frames selected by the user A (step S33). Next, the golf links reservation server 1 transmits a reservation success notification mail to the user A (step S34). The reservation success notification mail is an electronic mail used for a notification of securing the continuous frames selected by the reservation requester as continuous frames that can be reserved. The reservation success notification mail is an example of a notification of the desired time frames being the time frames that can be reserved according to the present invention. In the text of the reservation success notification mail, for example, a message representing a successful reservation for the continuous frames is written. In addition, the golf links reservation server 1 may not automatically register the reservation of the reservation requester. Here, the golf links reservation server 1 may only notify the reservation requester of the securement of the continuous frames selected by the reservation requester as continuous frames that can be reserved. In such a case, the reservation requester accesses the golf links reservation site and performs the processing of the reservation.

In step S29, in a case where the user B selects the disapproval button 330, the user terminal 3 transmits a disapproval message to the golf links reservation server 1. The approval message is a message used for user's notification of no acceptance of the movement of the time frame. The golf links reservation server 1 that has received the disapproval message transmits a reservation failure notification mail to the user A. The reservation failure notification mail is an electronic mail used for notifying that continuous frames selected by the reservation requester cannot be secured as continuous frames that can be reserved. In the text of the reservation failure notification mail, for example, a message representing a failure of the reservation for the continuous frames is written.

For example, the golf links reservation server 1 may transmit the reservation failure notification mail to the reservation requester in a case where the continuous frames selected by the reservation requester cannot be secured as continuous frames that can be reserved even when a predetermined time elapses after the reception of the reservation request. Alternatively, for example, the golf links reservation server 1 may transmit the reservation failure notification mail to the reservation requester in a case where the continuous frames selected by the reservation requester cannot be secured as continuous frames that can be reserved even when days left until a play date on which the continuous frames selected by the reservation requester are set are predetermined days or less.

[1-3-5. Provision of Information for Golf Links Provider]

The golf links reservation server 1 may provide the tendency of a desired number of frames designated by the user as the search condition for the golf links provider. The golf links reservation server 1 records each user's operation history for the golf links reservation site. The operation history includes the search condition at the time of user's requesting the search. For example, when the history of user's request operation of a search for golf links is recorded, the golf links reservation server 1 may also record a list of golf links retrieved under the search condition designated by the user. The golf links reservation server 1 may acquire the tendency of the number of desired frames for each golf links based on the operation history.

For example, when a request is received from the golf links terminal 2 according to an operation of the golf links provider, the golf links reservation server 1 may acquire the tendency of the desired number of frames. For example, the golf links reservation server 1 may extract the desired number of frames that has been designated the most frequently as the desired number of frames tending to be strongly designated or may extract the desired number of frames that has been designated a predetermined number of times or more with respect to the number of times of retrieving the golf links that is a target as the desired number of frames tending to be strongly designated. Then, the golf links reservation server 1, for example, may transmit a web page representing the desired number of frames tending to be strongly designated to the golf links terminal 2. Accordingly, the golf links provider can acquire the desired number of frames tending to be strongly designated. In addition, the golf links provider, by referring to the reservation status of each time frame, can acquire a reserved frame to be preferably moved and a movement destination thereof for securing the desired number of frames tending to be strongly designated as continuous frames that can be reserved. The golf links provider, for example, may request the user who has reserved the reserved frame to move the reserved frame. As a method of the request, for example, an electronic mail, a telephone, or the like may be used. In a case where the user accepts the movement of the reserved frame, for example, the golf links reservation server 1 moves the reserved frame by operating the golf links terminal 2.

The golf links reservation server 1 may provide information used for securing continuous frames configured by time frames corresponding to the desired number of frames tending to be strongly designated as continuous frames that can be reserved for the golf links provider. For example, the golf links reservation server 1 may determine the reservation possibility of continuous frames that are continuous frames configured by time frames of a desired number of frames tending to be strongly designated and include at least one reserved frame and calculate a reservation probability score thereof. Then, the golf links reservation server 1 may extract a reserved frame included in the continuous frames, of which the reservation probability score is a predetermined value or more, as a reserved frame of a movement source candidate. In addition, the golf links reservation server 1, for example, may search for a time frame of a movement destination candidate for moving the reserved frame of the movement source candidate to a range other than the continuous frames that are targets. Then, the golf links reservation server 1 may transmit a web page representing a combination of a reserved frame of the movement source candidate and the time frame of the movement destination candidate to the golf links terminal 2. In this way, the golf links provider can easily acquire a reserved frame to be moved and a preferable movement destination thereof that are preferable.

[1-3. Configuration of Golf Links Reservation Server]

Next, the configuration of the golf links reservation server 1 will be described with reference to FIGS. 8 to 10.

FIG. 8 is a block diagram that illustrates an example of the schematic configuration of the golf links reservation server 1 according to the present embodiment. As illustrated in FIG. 8, the golf links reservation server 1 includes: a communication unit 11; a storage unit 12; an input/output interface 13; and a system control unit 14. The system control unit 14 and the input/output interface 13 are interconnected through a system bus 15.

The communication unit 11 is connected to a network NW and is configured to control the states of communication with the golf links terminal 2, the user terminal 3, and the like.

The storage unit 12, for example, is configured by a hard disk drive or the like. The storage unit 12 is an example of a result storing means according to the present invention. In this storage unit 12, databases such as a member information DB 12a, a golf links information DB 12b, a reservation status DB 12c, a reservation information DB 12d, and an operation history DB 12e are built. Here, "DB" is an abbreviation of a database.

FIG. 9A is a diagram that illustrates an example of a content registered in the member information DB 12a. In the member information DB 12a, member information relating to users registered in the information processing system S as members is registered. More specifically, in the member information DB 12a, user attributes such as a user ID, a password, a nick name, a name, date of birth, sex, a zip code, an address, a phone number, an electronic mail address, golf handicap, possessed points are registered in association with each user. The user ID is identification information of a user. The user ID is an example of identification information according to the present invention. The possessed points represent the quantity of points that are currently possessed by the user.

FIG. 9B is a diagram that illustrates an example of a content registered in the golf links information DB 12b. In the golf links information DB 12b, golf links information relating to golf links is registered. More specifically, in the golf links information DB 12b, attributes of golf links such as a golf links ID, a golf links name, a zip code, an address, a phone number, a FAX number, an electronic mail address, time frame information, and plan information are registered in association with each golf links. The golf links ID is identification information of a golf links. The time frame information is information relating to time frames set by the golf links provider. For example, in the time frame information, start time of each time frame set in one day is set. The plan information is information relating to plans provided by the golf links provider.

FIG. 9C is a diagram that illustrates an example of a content registered in the reservation status DB 12c. In the reservation status DB 12c, the reservation status of each golf links is registered. More specifically, in the golf links information DB 12b, a golf links ID, a course ID, a play date, start time, a reservation flag, a reservation number, and the like are registered in association with each time frame. The course ID is identification information of a course. The start time represents a time frame. The reservation flag represents a reservation status. In the reservation flag, either "reserved" or "vacant" is set. The "reserved" represents that the time frame is a reserved frame. The "vacant" represents that the time frame is a vacant frame. The reservation number is identification number that is issued every time when a reservation is made. The reservation number is registered when the reservation flag is "reserved". In a case where continuous frames are reserved, the same reservation number is registered in association with the start time of each time frame corresponding to the continuous frames.

FIG. 9D is a diagram that illustrates an example of a content registered in the reservation information DB 12d. In the reservation information DB 12d, reservation information that represents each content of a reservation for a golf links is registered. The reservation information is information that represents a result of a user's reservation. More specifically, in the reservation information DB 12d, a reservation number, reservation date and time, a user ID, a golf links ID, a plan ID, a course ID, play date, the number of frames, start time, group information, a fee, a search condition, and the like are registered. The reservation number is information that identifies reservation information. The reservation date and time is date and time at which the reservation is made. The user ID represents a user who makes the reservation. In addition, the golf links ID, the plan ID, and the course ID respectively represent a golf links, a plan, and a course that are reserved. The number of frames represents the number of reserved time frames. The start time represents a reserved time frame. In a case where the number of frames is two or more, the start time is start time of the first time frame of the reserved continuous frames. The search condition is a search condition designated by the user for searching for a golf links and a plan that have been reserved.

The group information is information relating to a group planned to play golf. The group information corresponding to the number of frames is registered. FIG. 9E is a diagram that illustrates an example of a content set in the group information. As illustrated in FIG. 9E, in the group information, start time, the number of players, and a member list are set. The start time represents a time frame in which the group starts to play golf. The member list is a list of user IDs of members configuring the group.

FIG. 9F is a diagram that illustrates an example of a content registered in the operation history DB 12e. In the operation history DB 12e, a user's operation history at the golf links site is registered. In the operation history DB 12e, a user ID, an operation date and time, a URL, and the like are registered in association with each other. The golf links reservation server 1 registers an operation history every time when the user terminal 3 transmits a request to the golf links reservation server 1 as the user operates the user terminal 3. The user ID represents a user who performs the operation. The operation date and time is date and time at which the operation is performed. The URL is a URL that is set in the request from the user terminal 3. The golf links reservation server 1 can specify the content of the operation based on the URL. Examples of the user's operation at the golf links site include an operation of a request for search for golf links, an operation of a request for a search for a time frame, an operation of reading a golf page, an operation of a reservation, a login operation, and a logout operation. In a case where the operation history is a history of operations of requests for a search for golf links, the operation history may be registered in association with the list of retrieved golf links. In the list of golf links, for example, golf links IDs of the retrieved golf links are registered.

Next, the other information stored in the storage unit 12 will be described. In the storage unit 12, various kinds of data such as an HTML document used for displaying a web page, an XML (Extensible Markup Language) document, image data, text data, and an electronic document are stored. In addition, in the storage unit 12, various setting values, thresholds, constants, and the like are stored.

In addition, in the storage unit 12, various programs such as an operating system, a WWW (World Wide Web) server program, a DBMS (Database Management System), and a reservation management program are stored. The reservation management program is a program that is used for executing various processes relating to the reservation for golf links. The reservation management program is an example of an information processing program according to the present invention. In addition, the various programs, for example, may be acquired from another server apparatus or the like through the network NW or may be recorded on a recording medium such as a DVD (Digital Versatile Disc) and be read through a drive device. Furthermore, the reservation management program may be a program product.

The input/output interface 13 is configured to execute an interface process between the communication unit 11, the storage unit 12, and the system control unit 14.

Figure 10:
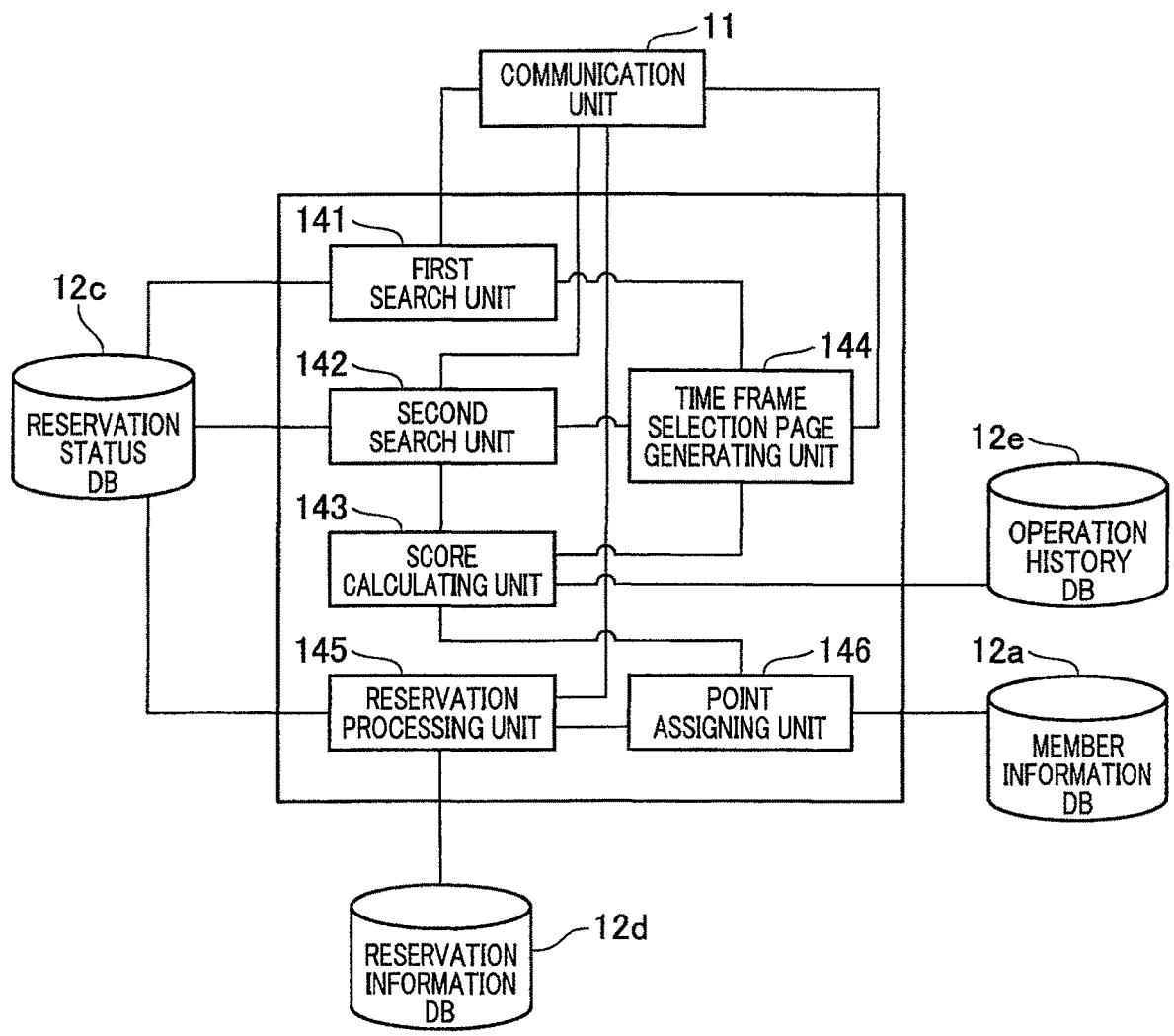
FIG. 10 is a diagram that illustrates an example of a functional block of a golf links reservation server 1 according to an embodiment.

FIG. 10 is a diagram that illustrates an example of the functional block of the golf links reservation server 1 according to the present embodiment. The system control unit 14 is configured by a CPU 14a, a ROM (Read Only Memory) 14b, a RAM (Random Access Memory) 14c, and the like. As the CPU 14a reads and executes various programs, as illustrated in FIG. 10, the system control unit 14 serves as a first search unit 141, a second search unit 142, a score calculating unit 143, a time frame selection page generating unit 144, a reservation processing unit 145, and a point assigning unit 146. The first search unit 141 is an example of a first search means according to the present invention. The second search unit 142 is an example of a second search means according to the present invention. The score calculating unit 143 is an example of an estimation means and a result acquiring means according to the present invention. The time frame selection page generating unit 144 is an example of a presentation control means according to the present invention. The reservation processing unit 145 is an example of a reservation request acquiring means, a request notification outputting means, an approval notification acquiring means, and a possible notification outputting means according to the present invention. The point assigning unit 146 is an example of a processing means according to the present invention.

The first search unit 141 searches for golf links and plans each having a time frame that can be reserved based on the search condition designated by the user. In a case where the user selects a combination of a plan and a play date on the golf links page, the first search unit 141 searches for time frames that can be reserved according to the selected combination. In a case where continuous frames are designated as the search condition, the first search unit 141 searches for continuous frames that can be reserved.

The second search unit 142, in a case where continuous frames are designated as the search condition, searches for golf links and plans having continuous frames that cannot be reserved but have a possibility of a reservation. In a case where the user selects a combination of a plan and play date on the golf links page, the second search unit 142 searches for continuous frames that cannot be reserved according to the selected combination but have a possibility of a reservation.

The score calculating unit 143 calculates reservation probability scores of the continuous frames retrieved by the second search unit.

The time frame selection page generating unit 144 generates an HTML document of the time frame selection page based on the search results acquired by the first search unit 141 and the second search unit 142. The time frame selection page generating unit 144 controls the display mode of the continuous frame information 110 of continuous frames retrieved by the second search unit 142 based on the reservation probability score calculated by the score calculating unit 143. The time frame selection page generating unit 144 transmits the generated HTML document, thereby causing the user terminal 3 to present the search result acquired by the first search unit 141 and the search result acquired by the second search unit 142 in modes distinguishable from each other.

The reservation processing unit 145 performs update of the reservation status, registration of reservation information, change of the reservation information, and the like. In addition, the reservation processing unit 145 performs a process for a request for a reservation for continuous frames including a reserved frame. More specifically, the reservation processing unit 145 outputs a time frame movement request mail, a time frame movement approval page, a reservation success notification mail, a reservation failure mail, and the like. In addition, the reservation processing unit 145 performs change of the reservation information of a reservation-completed person, registration of the reservation information of the reservation requester, and the like.

In a case where the reserved frame reserved by the reservation-completed person is moved by the process performed by the reservation processing unit 145, the point assigning unit 146 performs a process of assigning points to the reservation-completed person. In addition, the point assigning unit 146 determines the number of points to be assigned.

Here, the golf links reservation server 1 may be configured by a plurality of server apparatuses. For example, a server apparatus that searches for golf links and time frames at the reservation site, a server apparatus that performs a reservation process, a server apparatus that transmits a web page in response to a request from the user terminal 3, a server apparatus that transmits an electronic mail, a server apparatus that manages databases, and the like may be interconnected through a LAN or the like.

[1-4. Operation of Information Processing System]

Next, the operation of the information processing system S will be described with reference to FIGS. 11 to 16. An example of the operation described below is an example of a case where the time frame selection page as illustrated in FIG. 4 is displayed.

Figure 11:
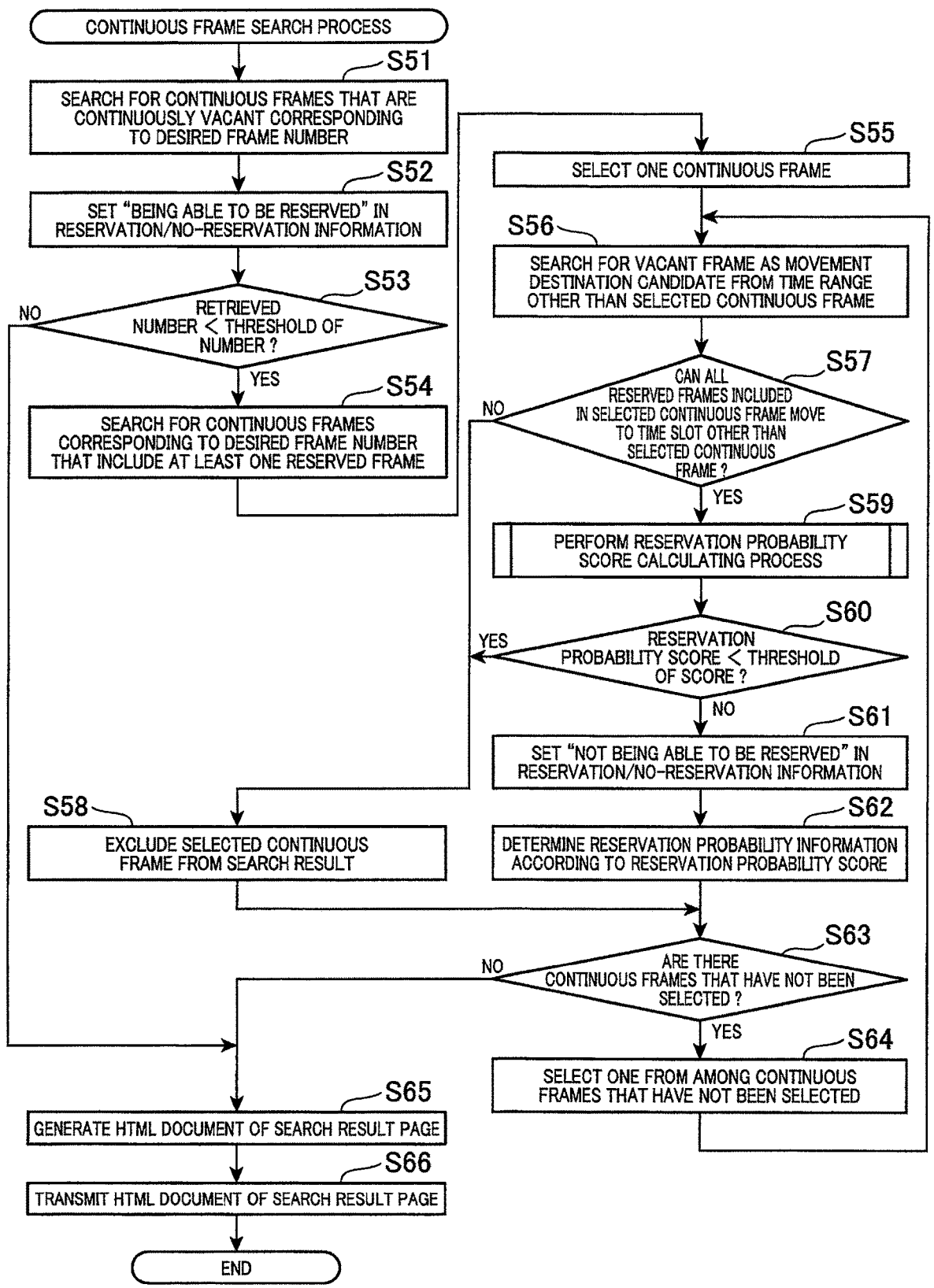
FIG. 11 is a flowchart that illustrates a processing example of a continuous frame searching process performed by a system control unit 14 of a golf links reservation server 1 according to an embodiment.

FIG. 11 is a flowchart that illustrates a processing example of a continuous frame searching process performed by the system control unit 14 of the golf links reservation server 1 according to the present embodiment. On the golf links page, when the user selects a combination of a plan and play date, the user terminal 3 transmits a time frame search request to the golf links reservation server 1. The time frame search request includes a plan ID of a plan selected by the user, play data, and a golf links ID of a gold links corresponding to the golf links page. In addition, the time frame search request includes the search condition (including designation of continuous frames and the desired number of frames) designated on the top page. The continuous frame searching process is started when the golf links reservation server 1 receives a time frame search request in a case where continuous frames are designated as the search condition.

The first search unit 141 acquires the time frame search request from the communication unit 11. Then, the first search unit 141 searches for continuous frames that are time frames continuously vacant for a desired number of frames set in the time frame search request (step S51). More specifically, the first search unit 141 searches the reservation status DB 12c for start times that are continuous for the desired number of frames and have all the reservation flags of "vacant" from among a plurality of start times associated with the golf links ID, the plan ID, and the play date set in the time frame search request. Next, the time frame selection page generating unit 144 determines "being able to be reserved" as the reservation/no-reservation information 112 of each retrieved continuous, frames (step S52).

Next, the time frame selection page generating unit 144 determines whether or not the number of retrieved continuous frames is less than the threshold stored in the storage unit 12 (step S53). At this time, in a case where the time frame selection page generating unit 144 determines that the number of the continuous frames is less than the threshold (Yes in step S53), the process proceeds to step S54. On the other hand, in a case where the time frame selection page generating unit 144 determines that the number of the continuous frames is the threshold or more (No in step S53), the process proceeds to step S65.

In step S54, the second search unit 142 searches for continuous frames that are continuous for the desired number of frames and include at least one reserved frame. More specifically, the second search unit 142 searches the reservation status DB 12c for start times that are continuous for the desired number of frames and have the reservation flag of at least one time frame as "reserved" from among a plurality of start times associated with the golf links ID, the plan ID, and the play date set in the time frame search request.

Next, the second search unit 142 selects one of the continuous frames retrieved in step S54 (step S55). Next, the second search unit 142 searches for a vacant frame from a time range other than the selected continuous frames (step S56). More specifically, the second search unit 142 searches the reservation status DB 12c for a start time of which the reservation flag is "vacant" from among a plurality of start times associated with the golf links ID, the plan ID, and the play data set in the time frame search request and a course ID of a course in which the selected continuous frames are set. At this time, the second search unit 142 excludes start times of time slots included in the selected continuous frames from the search targets.

Next, the second search unit 142 determines whether or not all the reserved frames included in the selected continuous frames can be moved to vacant frames other than the selected continuous frames (step S57). In a case where reserved frames as continuous frames are included in the selected continuous frames, the second search unit 142 determines whether or not the reserved frames can be moved as continuous frames. In the reservation status DB 12c, the reservation numbers respectively associated with start times of two or more time frames configuring continuous frames are the same. Accordingly, the second search unit 142 can determine whether or not the reserved frames are continuous frames. In a case where the second search unit 142 determines that at least one reserved frame included in the selected continuous frames cannot be moved (No in step S57), the process proceeds to step S58. On the other hand, in a case where the second search unit 142 determines that all the reserved frames included in the selected continuous frames can be moved (Yes in step S57), the process proceeds to step S59.

In step S58, the second search unit 142 excludes the selected continuous frames from the search result. Next, the second search unit 142 proceeds to step S63. The continuous frames excluded from the search result are continuous frames having no possibility of a reservation.

In step S59, the score calculating unit 143 executes the reservation probability score calculating process. In the reservation probability score calculating process, the reservation probability score of the selected continuous frames is calculated. The reservation probability score calculating process will be described later in detail.

Next, the time frame selection page generating unit 144 determines whether or not the calculated reservation probability score is less than a score threshold stored in the storage unit 12 (step S60). The score threshold is a threshold that is set in advance. At this time, in a case where the time frame selection page generating unit 144 determines that the reservation probability score is less than the score threshold (Yes in step S60), the process proceeds to step S58. Since the reservation probability is low, the selected continuous frames are excluded from the search result. On the other hand, in a case where the time frame selection page generating unit 144 determines that the reservation probability score is the score threshold or more (No in step S60), the process proceeds to step S61.

In step S61, the time frame selection page generating unit 144 determines "not being able to be reserved" as the reservation/no-reservation information 112 of the selected continuous frames. Next, the time frame selection page generating unit 144 determines "A", "B", or "C" as the reservation probability information 113 based on the calculated reservation probability score (step S62).

Next, the second search unit 142 determines whether or not there are continuous frames, which have not been selected, included in the continuous frames retrieved in step S54 (step S63). At this time, in a case where the second search unit 142 determines that there are continuous frames that have not been selected yet (Yes in step S63), the process proceeds to step S64. On the other hand, in a case where the second search unit 142 determines that all the continuous frames have been selected (No in step S63), the process proceeds to step S65.

In step S64, the second search unit 142 selects one of continuous frames that have not been selected yet from among the continuous frames retrieved in step S54. Next, the second search unit 142 causes the process to proceeds to step S56. Through steps S54 to S64, the second search unit 142 searches for continuous frames that include at least one reserved frame and have a possibility of a reservation.

In step S65, the time frame selection page generating unit 144 generates an HTML document of the time frame selection page based on the search result in step S51, the search result in steps S54 to S64, a setting of the reservation/no-reservation information 112, and a setting of the reservation probability information 113 (step S65). Next, the time frame selection page generating unit 144 transmits the generated HTML document to the user terminal 3 (step S66). Then, the time frame selection page generating unit 144 ends the continuous frame searching process. The user terminal 3, for example, displays the time frame selection page as illustrated in FIG. 4 based on the received HTML document.

Figure 12:
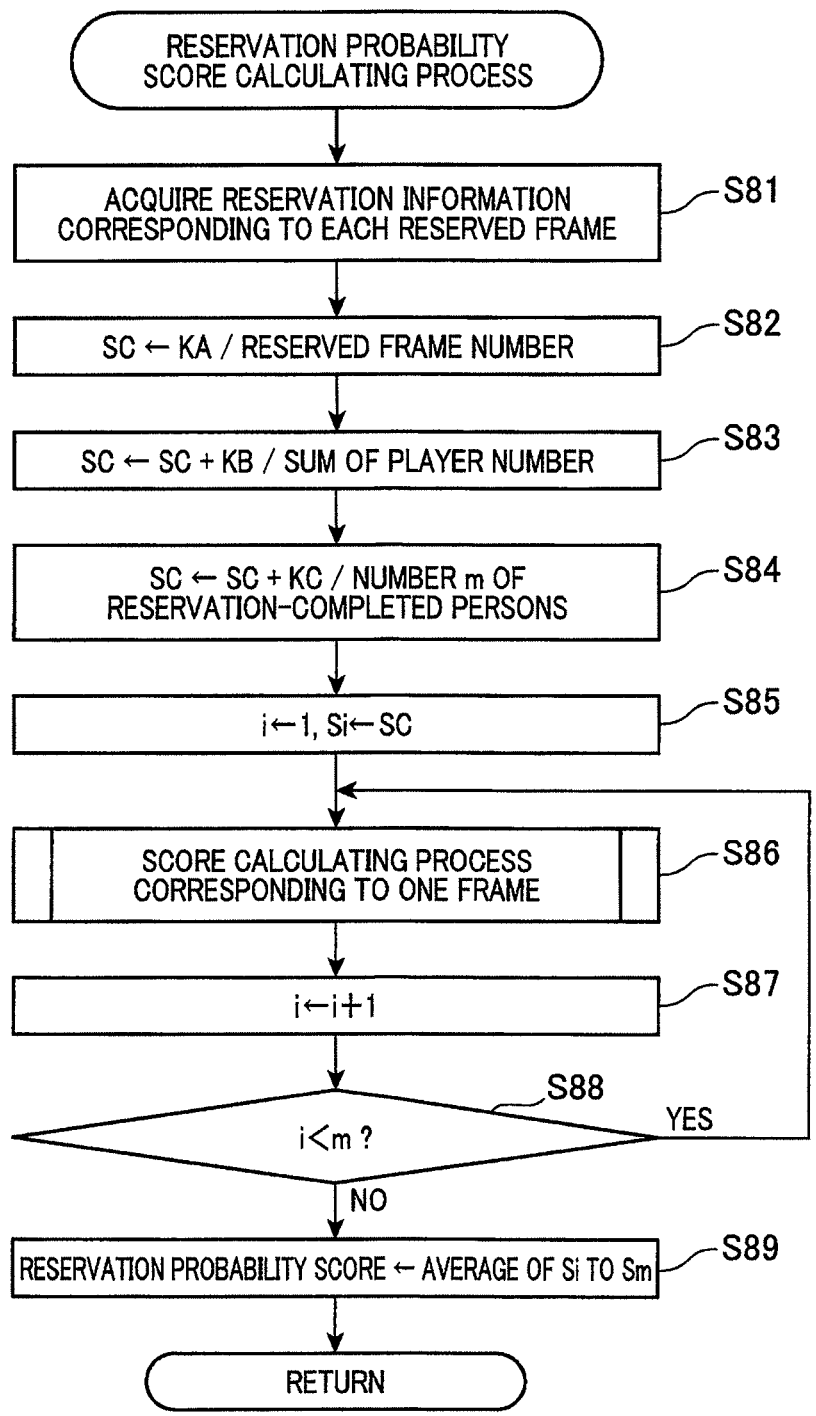
FIG. 12 is a flowchart that illustrates a processing example of a reservation probability score calculating process performed by a system control unit 14 of a golf links reservation server 1 according to an embodiment.

FIG. 12 is a flowchart that illustrates a processing example of the reservation probability score calculating process performed by the system control unit 14 of the golf links reservation server 1 according to the present embodiment.

As illustrated in FIG. 12, the score calculating unit 143 acquires reservation information corresponding to each reserved frame included in the selected continuous frames from the reservation information DB 12d (step S81). The reserved frame and the reservation information are associated with each other using a reservation number registered in the reservation status DB 12c and a reservation number included in the reservation information registered in the reservation information DB 12d.

Next, the score calculating unit 143 determines an adding value for the reservation probability score according to the number of reserved frames included in the selected continuous frames (step S82). For example, the score calculating unit 143 calculate "SC=SC+KA/number of reserved frames". Here, SC is a score for work. In addition, KA is a positive constant.

Next, the score calculating unit 143 determines an adding value for the reservation probability score according to the number of members to play golf in the reserved frame that is included in the selected continuous frames (step S83). More specifically, the score calculating unit 143 acquires the number of players based on each group information that is included in each reservation information acquired in step S81. Next, the score calculating unit 143 calculates a sum of the acquired numbers of players. Then, the score calculating unit 143, for example, calculates "SC=SC+KB/sum of numbers of players". Here, KB is a positive constant.

Next, the score calculating unit 143 determines an adding value for the reservation probability score according to the number m of reservation-completed persons who have reserved the reserved frames included in the selected continuous frames (step S84). For example, the score calculating unit 143 calculates "SC=SC+KC/m". Here, KB is a positive constant. In the reservation status DB 12c, for start times of which the reservation numbers are different from each other, the reservation-completed persons are different. Accordingly, based on the reservation status DB 12c, the number m of reservation-completed persons can be calculated.

Next, the score calculating unit 143 sets one to an index i. In addition, the score calculating unit 143 sets SC to a score Si (step S85). The score Si is a reservation probability score of the reserved frame reserved by one of the reservation-completed persons who have reserved the reserved frames included in the selected continuous frames. In a case where the reserved frames reserved by the reservation-completed person are continuous frames, the score Si is a reservation probability score of the reserved frames as continuous frames.

Next, the score calculating unit 143 executes a score calculating process corresponding to one frame (step S86). In the score calculating process corresponding to one frame, a final score Si is calculated as a reservation probability score of the reserved frame reserved by one reservation-completed person. The score calculating process corresponding to one frame will be described later in detail.

Next, the score calculating unit 143 the score calculating unit 143 adds one to the index i (step S87). Next, the score calculating unit 143 determines whether or not the index i is less than the number m of reservation-completed persons (step S88). At this time, in a case where the score calculating unit 143 determines that the index i is less than the value of the number m of the reservation-completed persons (Yes in step S88), the process proceeds to step S86. On the other hand, in a case where the score calculating unit 143 determines that the index i is the value of the number m of the reservation-completed persons or more (No in step S88), the process proceeds to step S89. By executing steps S85 to S88, the score calculating unit 143 calculates scores SC1 to SCm In step S89, the score calculating unit 143 calculates an average of the scores SC1 to SCm. Then, the score calculating unit 143 determines the calculated average as the reservation probability score. When this process ends, the score calculating unit 143 ends the reservation probability score calculating process.

Figure 13:
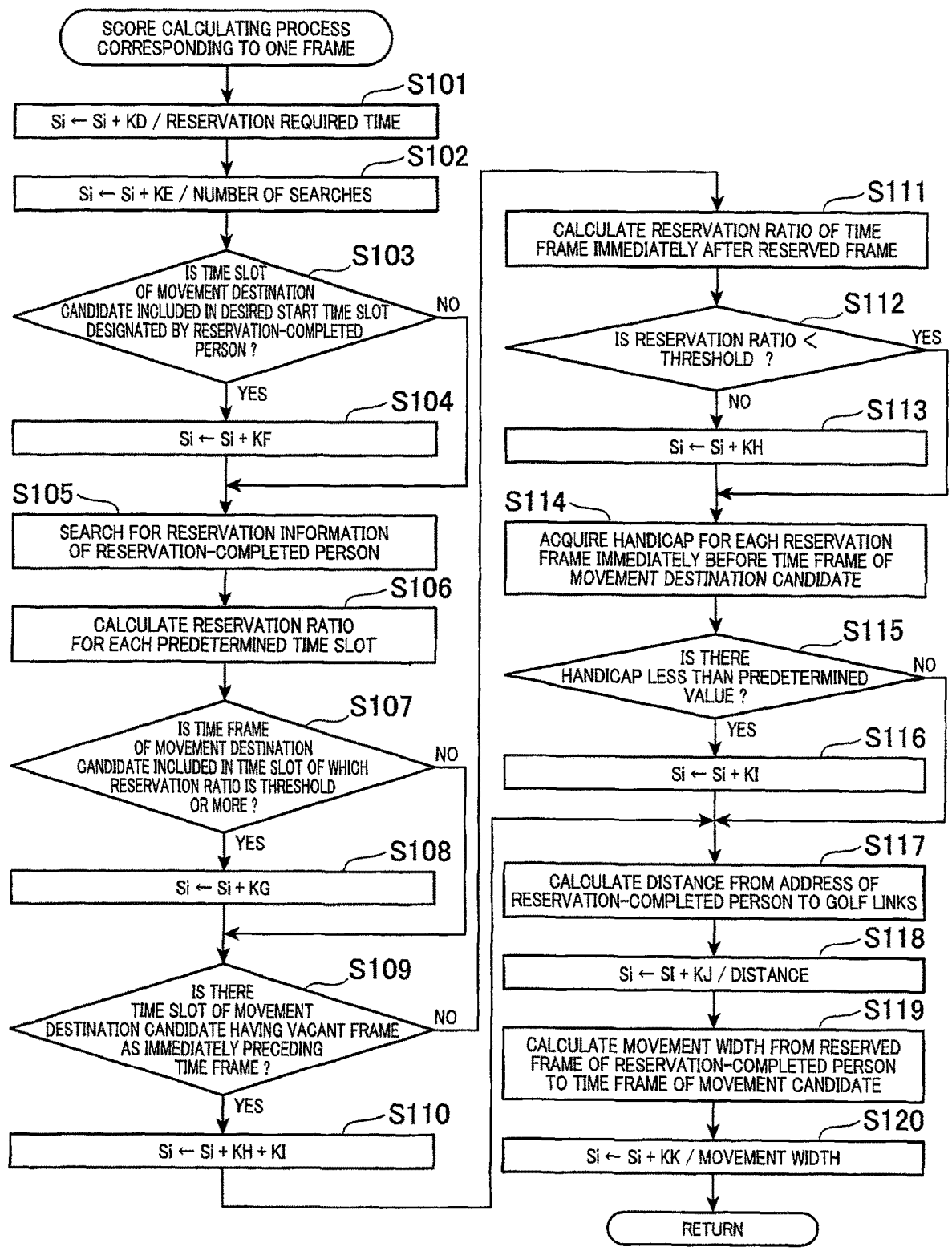
FIG. 13 is a flowchart that illustrates a processing example of a score calculating process corresponding to one frame performed by a system control unit 14 of a golf links reservation server 1 according to an embodiment.

FIG. 13 is a flowchart that illustrates a processing example of the score calculating process corresponding to one frame performed by the system control unit 14 of the golf links reservation server 1 according to the present embodiment.

As illustrated in FIG. 13, the score calculating unit 143 determines an adding value for the reservation probability score according to the reservation required time of a reservation-completed person corresponding to the index i (step S101). More specifically, the score calculating unit 143 acquires a user ID and reservation date and time from the reservation information of the reservation-completed person corresponding to the index i. Next, the score calculating unit 143 searches the operation history DB 12e for an operation history including the user ID acquired from the reservation information. Next, based on the retrieved operation history, the score calculating unit 143 specifies date and time that is closest to the reservation date and time among date and time corresponding to login made before the reservation date and time. Next, the score calculating unit 143 calculates a difference between the specified date and time and the reservation date and time, thereby calculating a reservation required time. Then, the score calculating unit 143, for example, calculates "Si=Si+KD/reservation required time". Here, KD is a positive constant.

Next, the score calculating unit 143 determines an adding value for the reservation probability score according to the number of searches performed by the reservation-completed person corresponding to the index i. (step S102). More specifically, the score calculating unit 143 counts the number of searches performed from login date and time to the reservation date and time based on the retrieved operation history. Then, the score calculating-unit 143, for example, calculates "Si=Si+KE/number of searches". Here, KE is a positive constant.

Next, the score calculating unit 143 determines an adding value for the reservation probability score based on the desired start time slot designated by the reservation-completed person corresponding to the index i. More specifically, a desired start time slot is acquired from the search condition included in the reservation information of the reservation-completed person corresponding to the index i. Then, the score calculating unit 143 determines whether or not at least one of the time frames of movement destination candidates is included in the desired start time slot (step S103). At this time, in a case where the score calculating unit 143 determines that at least one of the time frames of the movement destination candidates is included in the desired start time slot (Yes in step S103), the process proceeds to step S104. On the other hand, in a case where the score calculating unit 143 determines that none of the time frames of all the movement destination candidates is included in the desired start time slot (No in step S103), the process proceeds to step S105.

In step S104, the score calculating unit 143, for example, calculates "Si=Si+KF". Here, KF is a positive constant. Next, the score calculating unit 143 causes the process to proceed to step S105.

In steps S105 to S108, the score calculating unit 143 determines an adding value for the reservation probability score based on the tendency of the time slots reserved by the reservation-completed person corresponding to the index i. More specifically, the score calculating unit 143 searches the reservation information DB 12*d* for all the reservation information including the user ID of the reservation-completed person corresponding to the index i (step S105) Next, the score calculating unit 143 calculates a ratio of the reservations of each predetermined time slot that are performed by the reservation-completed person corresponding to the index i based on the start time and the number of frames included in each retrieved reservation information (step S106). Next, the score calculating unit 143 determines whether or not at least one of the time frames of the movement destination candidates is included in a time slot of which the reservation ratio is a predetermined value or more (step 3107). At this time, in a case where the score calculating unit 143 determines that the time frame of at least one movement destination candidate is included in the time slot of which the reservation ratio is the predetermined value or more (Yes in step 3107), the process proceeds to step S108. On the other hand, in a case where the score calculating unit 143 determines that none of the time frames of all the movement destination candidates is included in the time slot of which the reservation ratio is the predetermined value or more (No in step S107), the process proceeds to step S109. In step S108, the score calculating unit 143, for example, calculates "Si=Si+KG". Here, KG is a positive constant. Next, the score calculating unit 143 causes the process to proceed to step 3109.

In steps S109 to S116, the score calculating unit 143 calculates an adding value for the reservation probability score based on the tendency of the reservation-completed person corresponding to the index i for reserving a time frame immediately after a reserved frame of the other person and golf skill of a member playing golf in a reserved frame of the other person immediately before the time frame of a movement destination candidate. More specifically, the score calculating unit 143 determines whether or not a time frame immediately before a time frame of at least one movement destination candidate among the time frames of movement destination candidates is a vacant frame (step S109). At this time, in a case where the score calculating unit 143 determines that the time frame immediately before the time frame of at least one movement destination candidate is a vacant frame (Yes in step S109), the process proceeds to step S110. On the other hand, in a case where the score calculating unit 143 determines that time frames immediately before the time frames of all the movement destination candidates are reserved frames (No in step S109), the process proceeds to step S111.

In step S110, the score calculating unit 143, for example, calculates "Si=Si+KH+KI". Here, KH and HI are positive constants. Next, the score calculating unit 143 causes the process to proceed to step S117. In a case where the time frame immediately before the time frame of at least one movement destination candidate is a vacant frame, the time frame of the movement destination candidate that is disposed immediately before the vacant frame may be set as the movement destination regardless of the tendency for reserving a time frame immediately after a reserved frame of the other person. Accordingly, in this case, the reservation probability increases, and thus, KH is added to the reservation probability score. In addition, in a case where the reserved frame can be moved to the time frame of the movement destination candidate disposed immediately before the vacant frame, the golf skill of a member playing golf in the reserved frame of the other person does not matter. Accordingly, in such a case, the reservation probability increases, and thus, KI is added to the reservation probability score.

In step S111, the score calculating unit 143 counts, among reservations made by the reservation-completed person in the past, the number of reservations each having a time frame immediately before the reserved time frame as being a reserved frame and the number of reservations each having a time frame immediately before the reserved time frame as being a vacant frame based on the reservation information retrieved in step S105 and the reservation status DB 12*c*. Then, the score calculating unit 143 calculates a ratio of reservations each having a time frame immediately after the reserved frame being reserved to all the reservations made by the reservation-completed person. Next, the score calculating unit 143 determines whether or not the ratio of reservations each having a time frame immediately after the reserved frame being reserved is less than a predetermined value (step S112). At this time, in a case where the score calculating unit 143 determines that the ratio of reservations each having a time frame immediately before the reserved frame being reserved is less than the predetermined value (Yes in step S112), the process proceeds to step S114. On the other hand, in a case where the score calculating unit 143 determines that the ratio of reservations each having a time frame immediately before the reserved frame being reserved is the predetermined value or more (No in step S112), the process proceeds to step S113.

In step S113, the score calculating unit 143, for example, calculates "Si=Si+KH". Next, the score calculating unit 143 causes the process to proceed to step S114.

In step S114, the score calculating unit 143 acquires reservation information corresponding to the reserved frame immediately before the time frame of each movement destination candidate from the reservation information DB 12d. Next, the score calculating unit 143 acquires the user ID from the member list of the group information corresponding to the reserved frame among the group information included in the retrieved reservation information. Next, the score calculating unit 143 acquires a handicap corresponding to the acquired user ID from the member information DB 12a. Next, the score calculating unit 143 selects a highest handicap for each reserved frame immediately before the time frame of the movement destination candidate. Next, the score calculating unit 143 determines whether or not a handicap less than a predetermined value is present in the selected handicaps (step S115). At this time, in a case where the score calculating unit 143 determines that a handicap less than the predetermined value is present (Yes in step S115), the process proceeds to step S116. On the other hand, in a case where the score calculating unit 143 determines that a handicap less than the predetermined value is not present (No in step S115), the process proceeds to step S117.

In step S116, the score calculating unit 143, for example, calculates "Si=Si+KI". In other words, in a case where the handicaps of all the members of a group are less than the predetermined value, the progress of the play is not delayed. On the other hand, in a case where there is at least one of the members of a group having a handicap of the predetermined value or more, the progress of the play is delayed. In a case where the handicaps of all the members of a group playing golf in a reserved frame immediately before the time frame of at least one movement destination candidate among the time frames of movement destination candidates are less than a predetermined value, the time frame of the movement destination candidate may be set as the movement destination. Accordingly, in this case, the reservation probability increases, and thus, KI is added to the reservation probability score. Next, the score calculating unit 143 causes the process to proceed to step S117.

In steps S117 and S118, the score calculating unit 143 determines an adding value for the reservation probability score according to the degree of easiness of movement from the address of the reservation-completed person corresponding to the index i to the golf links. More specifically, the score calculating unit 143 acquires an address from the member information including the user ID of the reservation-completed person corresponding to the index i. In addition, the score calculating unit 143 acquires an address from the golf links information including the golf links ID included in the time frame search request. Then, the score calculating unit 143 calculates a distance from the address of the reservation-completed person to the golf links based on the acquired addresses (step S117). Next, the score calculating unit 143, for example, calculates "Si=Si+KJ/distance" (step S118). Here, KJ is a positive constant. Next, the score calculating unit 143 causes the process to proceed to step S119.

In steps S119 and S120, the score calculating unit 143 determines an adding value for the reservation probability score according to the movement width of the reserved frame. More specifically, the score calculating unit 143 calculates a difference between the start time of the reserved frame of the reservation-completed person corresponding to the index i and the start time of the time frame of the movement destination candidate. Then, the score calculating unit 143 sets the absolute value of the calculated difference as the movement width (step S119). In a case where there are a plurality of time frames of movement destination candidates, the score calculating unit 143 calculates a movement width for the time frame of each movement destination candidate and selects a shortest movement width from among the calculated movement widths. Next, the score calculating unit 143, for example, calculates "Si=Si+KK/movement width" (step S120). Here, KK is a positive constant. Then, the score calculating unit 143 ends the score calculating process corresponding to one frame.

Figure 14:
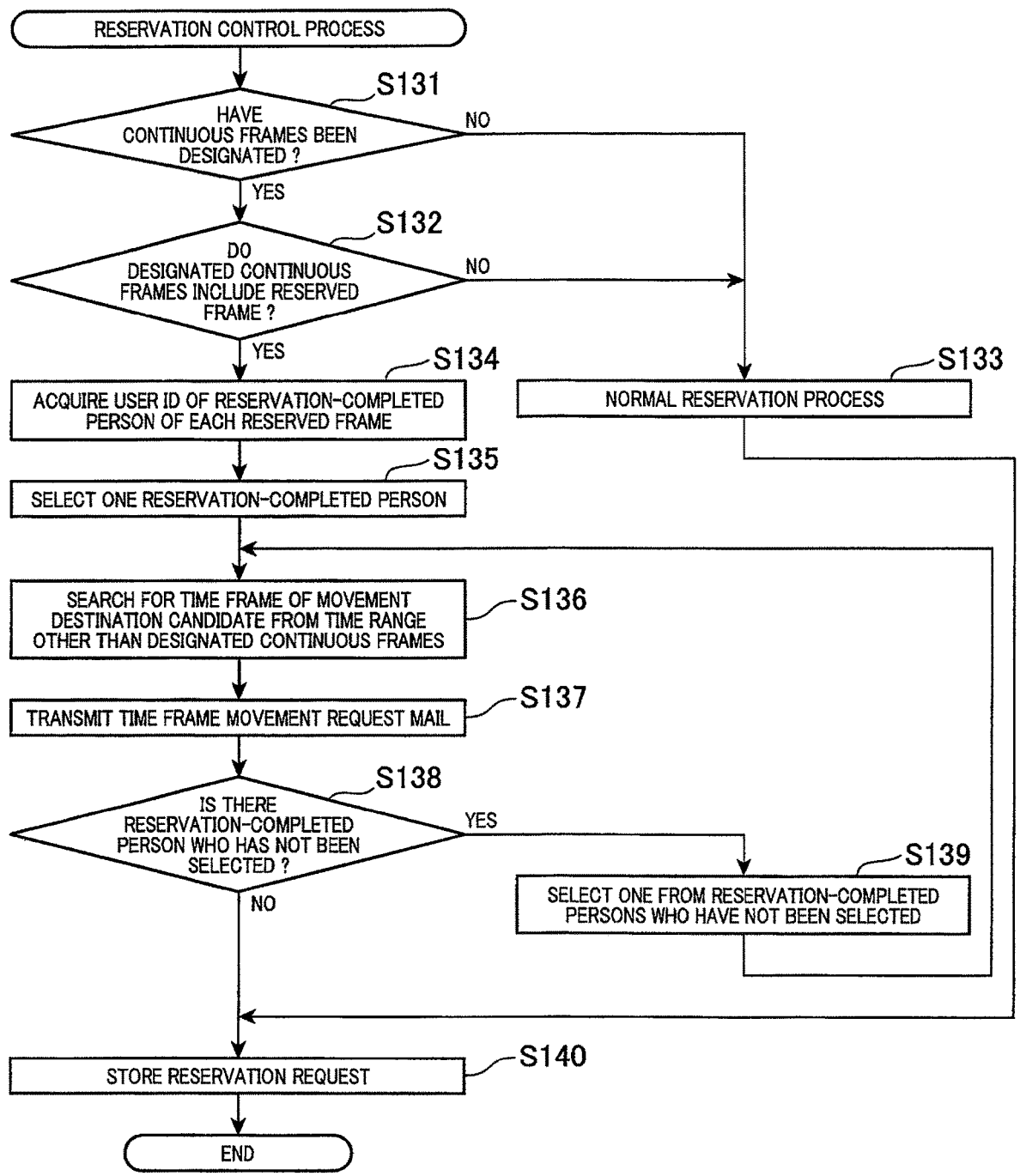
FIG. 14 is a flowchart that illustrates a processing example of a reservation control process performed by a system control unit 14 of a golf links reservation server 1 according to an embodiment.

FIG. 14 is a flowchart that illustrates a processing example of the reservation control process performed by the system control unit 14 of the golf links reservation server 1 according to the present embodiment. When the user A inputs necessary information on the reservation processing page, the user terminal 3 transmits a reservation request to the golf links reservation server 1. The reservation request includes: a user ID of the reservation requester; a golf links ID of a golf links that is selected on the golf links search result page; a plan ID and play date of a plan selected on the golf links page; a search condition designated on the top page; start time of a time frame and a course ID of a course selected on the time frame selection page; information input on the reservation processing page; and the like. The reservation control process is started when the golf links reservation server 1 receives the reservation request.

As illustrated in FIG. 14, the reservation processing unit 145 determines whether or not continuous frames are designated in the search condition set in the reservation request (step S131). At this time, in a case where the reservation processing unit 145 determines that continuous frames are not designated (No in step S131), the process proceeds to step S133. On the other hand, in a case where reservation processing unit 145 determines that continuous frames are designated (Yes in step S131), the process proceeds to step S132.

In step S132, the reservation processing unit 145 determines whether or not the designated continuous frames include at least one reserved frame. More specifically, the reservation processing unit 145 searches the reservation status DB 12c for a reservation status including a golf links ID, a course ID, and play date set in the reservation request. Next, the reservation processing unit 145 acquires reservation statuses of the desired number of frames set in the reservation request from reservation statuses including the start time set in the reservation request among the retrieved reservation statuses. Then, the reservation processing unit 145 performs a determination based on the reservation flag included in the acquired reservation status. At this time, in a case where the reservation processing unit 145 determines that the designated continuous frames include at least one reserved frame (Yes in step S132), the process proceeds to step S134. On the other hand, in a case where the reservation processing unit 145 determines that the designated continuous frames do not include any reserved frame (No in step S132), the process proceeds to step S133.

In step S133, the reservation processing unit 145 performs a normal reservation process. More specifically, the reservation processing unit 145 sets "reserved" to reservation flag corresponding to the golf links ID, the course ID, the play data, the start time, and the desired number of frames, which are set in the reservation request, in the reservation status DB 12c and sets a new reservation number to the reservation number. Then, the reservation processing unit 145 registers the reservation information in the reservation information DB 12d based on the information set in the reservation request. When this process ends, the reservation processing unit 145 ends the reservation control process.

In step S134, the reservation processing unit 145 acquires a user ID of the reservation-completed person who has reserved the reserved frame included in the continuous frames designated by the reservation requester. More specifically, the reservation processing unit 145 searches the reservation information DB 12d for the reservation information including the reservation number set in the reservation status acquired in step S132. Then, the reservation processing unit 145 acquires a user ID from the retrieved reservation information.

Next, the reservation processing unit 145 selects one reservation-completed person among the reservation-completed persons reserving the reserved frames included in the continuous frames designated by the reservation requester (step S135). Next, the reservation processing unit 145 searches for a time frame of a movement destination candidate from a time range other than the continuous frames designated by the reservation requester (step S136). More specifically, the reservation processing unit 145 searches the reservation status DB 12c for a start time having a reservation flag of "vacant" among a plurality of start times associated with the golf links ID, the course ID, and the play date set in the reservation request. At this time, the second search unit 142 excludes a start time of a time slot included in the selected continuous frames from the search targets. In a case where the selected reservation-completed person reserves the reserved frames as continuous frames, the reservation processing unit 145 searches for continuous frames as a movement destination candidate.

Next, the reservation processing unit 145 generates a time frame movement request mail based on the reservation information of the selected reservation-completed person, the time frames of retrieved movement destination candidates, and the like. Then, the reservation processing unit 145 transmits a time frame movement request mail to the selected reservation-completed person (step S137). The reservation processing unit 145 acquires an electronic mail address from the member information that includes the user ID of the reservation-completed person as the electronic mail address of the destination.

Next, the reservation processing unit 145 determines whether or not there is a reservation-completed person who has not been selected among the reservation-completed persons reserving the reserved frames included in the continuous frames designated by the reservation requester (step S138). At this time, in a case where the reservation processing unit 145 determines that there is a reservation-completed person who has not been selected yet (Yes in step S138), the process proceeds to step S139. In step S139, the reservation processing unit 145 selects one among the reservation-completed persons who have not been selected. Next, the reservation processing unit 145 causes the process to proceed to step S136. On the other hand, in a case where reservation processing unit 145 determines that all the reservation-completed persons have been selected (No in step S138), the process proceeds to step S140. In step S140, the reservation processing unit 145 temporarily stores the received reservation request and the user ID of the reservation-completed person acquired in step S134 in the storage unit 12 in association with a temporary reservation number. Then, the reservation processing unit 145 ends the reservation control process.

Figure 15:
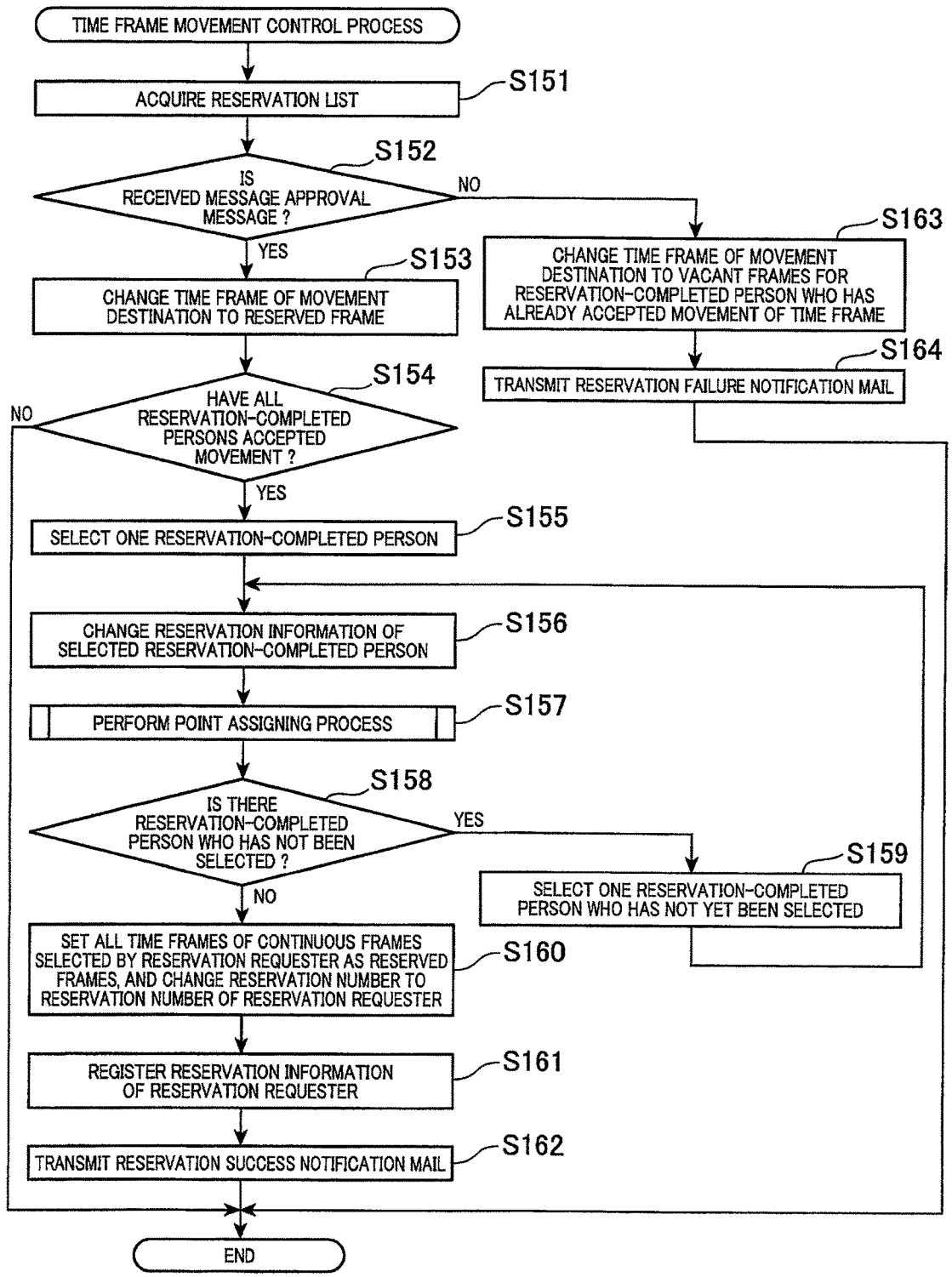
FIG. 15 is a flowchart that illustrates a processing example of a time frame movement control process performed by a system control unit 14 of a golf links reservation server 1 according to an embodiment.

FIG. 15 is a flowchart that illustrates a processing example of the time frame movement control process performed by the system control unit 14 of the golf links reservation server 1 according to the present embodiment. On the time frame movement approval page, the user selects the approval button 320 or the disapproval button 330. Then, the user terminal 3 transmits either an approval message or a disapproval message to the golf links reservation server 1 according to the user's selection. Each of the approval message and the disapproval message includes a temporary reservation number, a user ID of the reservation-completed person performing the operation on the time frame movement approval page, and the reservation number acquired when the reservation-completed person reserves the reserved frame. In addition, the approval message includes start time selected by the reservation-completed person on the time frame movement approval page and the number of the reserved frames. The time frame movement control process is started when the golf links reservation server 1 receives either the approval message or the disapproval message.

As illustrated in FIG. 15, the reservation processing unit 145 acquires a reservation message and a user ID of the reservation-completed person corresponding to the temporary reservation number included in the received message from the storage unit 12 (step S151). Next, the reservation processing unit 145 determines whether or not the received message is the approval message (step S152). At this time, in a case where the reservation processing unit 145 determines that the received message is the approval message (Yes in step S152), the process proceeds to step S153. On the other hand, in a case where the reservation processing unit 145 determines that the received message is the disapproval message (No in step S152), the process proceeds to step S163.

In step S153, the reservation processing unit 145 changes the time frame of the movement destination selected by the reservation-completed person who has accepted the movement of the time frame as a reserved frame. More specifically, the reservation processing unit 145 sets "reserved" and the reservation number of the reservation-completed person included in the approval notification message to the reservation flag corresponding to the golf links ID, the course ID, and the play date set in the reservation request and start time and the number of frames set in the approval message and the reservation number in the reservation status DB 12c. In addition, the reservation processing unit 145 stores the reservation number of the reservation-completed person, the start time, and the number of frames set in the approval message in the storage unit 12 in association with the temporary reservation number and the user ID set in the approval message.

Next, the reservation processing unit 145, determines whether or not all the reservation-completed persons reserving the reserved frames included in the continuous frames selected by the reservation requester have accepted the movement of the time frames (step S154). For example, in a case where the reservation number is associated with each of user IDs of all the reservation-completed persons stored in the storage unit 12 in association with the temporary reservation number set in the approval message, all the reservation-completed persons have accepted the movement of the time frames. At this time, in a case where the reservation processing unit 145 determines that all the reservation-completed persons have accepted the movement of the time frames (Yes in step S154), the process proceeds to step S155. On the other hand, in a case where the reservation processing unit 145 determines that there is at least one reservation-completed person who has not accepted the movement of the time frame (No in step S154), the time frame movement control process ends.

In step S155, the reservation processing unit 145 selects one of all the reservation-completed persons reserving the reserved frames included in the continuous frames selected by the reservation requester based on the user ID acquired in step S151. Next, the reservation processing unit 145 changes the reservation information of the selected reservation-completed person in the reservation information DB 12d (step S156). More specifically, the reservation processing unit 145 acquires a reservation number and start time stored in the storage unit 12 in association with the temporary reservation number of the user ID of the selected reservation-completed person. Then, the reservation processing unit 145 changes the start time of the reservation information corresponding to the acquired reservation number to the acquired start time. In addition, the reservation processing unit 145 also changes the start time of each frame number information included in the reservation information.

Next, the point assigning unit 146 performs a point assigning process (step S157). In the point assigning process, a process of increasing the points owned by the selected reservation-completed person is performed. The point assigning process will be described later in detail.

Thereafter, the reservation processing unit 145 determines whether or not there is a reservation-completed person who has not been selected among the reservation-completed persons reserving the reserved frames that are included in the continuous frames selected by the reservation requester (step S158). At this time, in a case where the reservation processing unit 145 determines that there is a reservation-completed person who has not been selected yet (Yes in step S158), the process proceeds to step S159. In step S159, the reservation processing unit 145 selects one of the reservation-completed persons who have not been selected. Next, the reservation processing unit 145 causes the process to proceed to step S156. On the other hand, in a case where the reservation processing unit 145 determines that all the reservation-completed persons have been selected (No in step S158), the process proceeds to step S160.

In step S160, the reservation processing unit 145 sets all the time frames of the continuous frames selected by the reservation requester as reserved frames. In addition, the reservation processing unit 145 determines the temporary reservation number included in the approval message as a new reservation number of the reservation requester. Then, the reservation processing unit 145 changes the reservation numbers of all the time frames of the continuous frames selected by the reservation requester to the new reservation number of the reservation requester in the reservation status DB 12c.

Next, the reservation processing unit 145 registers the reservation information of the reservation requester in the reservation information DB 12d (step S161). The process of steps S160 and S161 is basically the same as that of step S133 of the reservation control process illustrated in FIG. 14. Next, the reservation information DB 12d transmits a reservation success notification mail to the reservation requester (step S162). The reservation processing unit 145 acquires an electronic mail address from the member information including the user ID of the reservation requester as an electronic mail address of the destination. Then, the reservation information DB 12d ends the time frame movement control process. Here, the reservation processing unit 145 may transmit an electronic mail notifying that the reserved frame has been moved to the reservation-completed persons who have already accepted the movement of time frames.

In step S163, the reservation processing unit 145 changes the time frame of the movement destination to a vacant frame for the reservation-completed person who has already accepted the movement of the time frame. More specifically, the reservation processing unit 145 acquires the start time and the number of frames of the time frames of the movement destination stored in the storage unit 12 in association with the temporary reservation number. Next, the reservation processing unit 145 sets "vacant" in the reservation flag corresponding to the golf links ID, the course ID, and the play date set in the reservation request in the reservation status DB 12c and the start time and the number of frames acquired from the storage unit 12. Next, the reservation processing unit 145 transmits a reservation failure notification mail to the reservation requester (step S164). Then, the reservation processing unit 145 ends the time frame movement control process. In addition, the reservation processing unit 145 may transmit an electronic mail notifying that the reserved frame has not been moved to the reservation-completed person who has already accepted the movement of the time frame.

Figure 16:
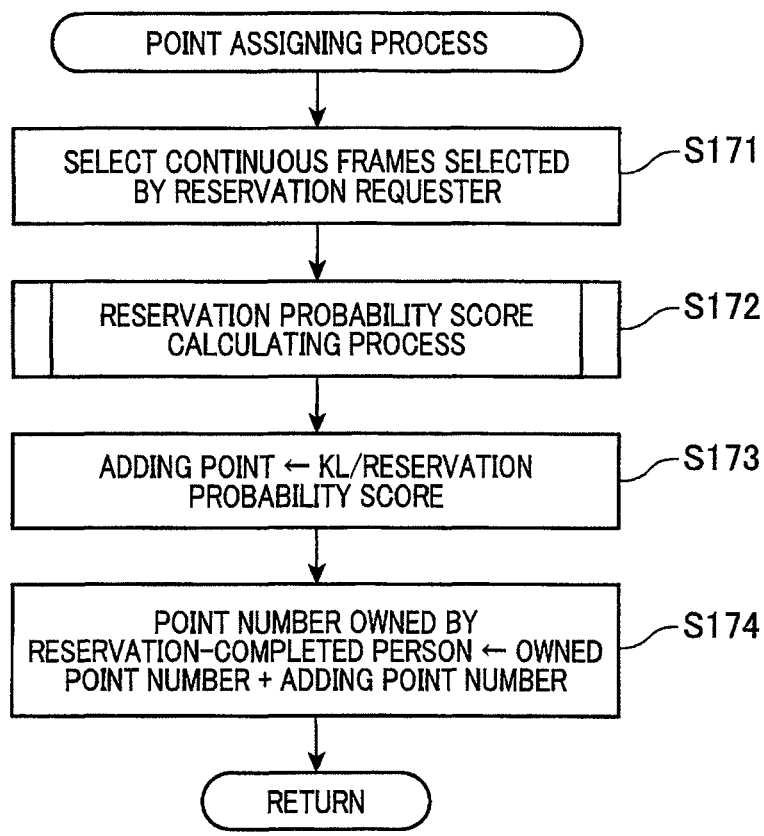
FIG. 16 is a flowchart that illustrates a processing example of a point assigning process performed by a system control unit 14 of a golf links reservation server 1 according to an embodiment.

FIG. 16 is a flowchart that illustrates a processing example of the point assigning process performed by the system control unit 14 of the golf links reservation server 1 according to the present embodiment.

As illustrated in FIG. 16, the point assigning unit 146 selects the continuous frames selected by the reservation requester as a parameter of the reservation probability score calculating process (step S171). Next, the point assigning unit 146 executes the reservation probability score calculating process (step S172). Next, the point assigning unit 146 calculates adding points (step S173). For example, the point assigning unit 146 calculates "the adding point number=KL/reservation probability score". Here, KL is a positive constant.

Next, the point assigning unit 146 adds the adding point number to an owned point number that is included in the member information of the reservation-completed person registered in the member information DB 12a (step S174). Then, the point assigning unit 146 ends the point assigning process.

As described above, according to the present embodiment, the system control unit 14 searches for continuous frames that can be reserved according to a user's request among a plurality of time frames set as time frames for the use of a golf links and searches for continuous frames according to a user's request that include at least one reserved frame and have a possibility of a reservation as a reservation-completed person who has reserved the reserved frame accepts the movement of the reserved frame and presents a result of the search for the continuous frames that can be reserved and the continuous frames having a possibility of a reservation in modes distinguishable from each other. For this reason, the continuous frames can be easily reserved.

In addition, the system control unit 14 estimates a reservation probability that the continuous frames having a possibility of a reservation become able to be reserved by calculating the reservation probability score and controls the presentation mode of the continuous frame information 110 of the continuous frames having a possibility of being able to be reserved based on the estimated probability. For this reason, the user can recognize the probability of being able to be reserved.

In addition, the system control unit 14 estimates the reservation probability based on the number of reserved frames included in the continuous frames having a possibility of being able to be reserved. For this reason, the burden of the adjustment of schedules for moving the time frame can be reflected on the presentation mode of the continuous frame information 110 of the continuous frames having a possibility of being able to be reserved.

Furthermore, the system control unit 14 estimates the reservation probability based on the number players in the reserved frame included in the continuous frames having a possibility of being able to be reserved. For this reason, the burden of the adjustment of schedules for moving the time frame can be reflected on the presentation mode of the continuous frame information 110 of the continuous frames having a possibility of being able to be reserved.

In addition, the system control unit 14 specifies reservation-completed persons who have reserved one or more reserved frames included in the continuous frames having a possibility of being able to be reserved and estimates the reservation probability based on the number of the reservation-completed persons who have made the reservations. For this reason, a situation in which the probability of being able to be reserved is a multiplication of probabilities of the acceptance of the movement of the reserved frames that is performed by the reservation-completed persons can be reflected on the presentation mode of the continuous frame information 110 of the continuous frames having a possibility of being able to be reserved.

Furthermore, the system control unit 14 estimates the reservation probability based on a movement width from one or more reserved frames included in the continuous frames having a possibility of being able to be reserved to a time frame that can be reserved of a range excluding the continuous frames having a possibility of being able to be reserved. For this reason, user's burden of the adjustment of schedules for moving the time frame can be reflected on the presentation mode of the continuous frame information 110 of the continuous frames having a possibility of being able to be reserved.

In addition, the system control unit 14 estimates the reservation probability based on a time required for the reservation-completed person to reserve the reserved frame after the reservation-completed person's request for the search. For this reason, the degree of reservation-completed person's pondering performed until the reservation can be reflected on the presentation mode of the continuous frame information 110 of the continuous frames having a possibility of being able to be reserved.

Furthermore, the system control unit 14 estimates the reservation probability based on the number of requests for searches performed until the reservation for the reserved frame that is performed by the reservation-completed person. For this reason, the degree of reservation-completed person's pondering performed until the reservation can be reflected on the presentation mode of the continuous frame information 110 of the continuous frames having a possibility of being able to be reserved.

In addition, the system control unit 14 estimates the reservation probability based on a reservation status of a range excluding the continuous frames having a possibility of being able to be reserved in a desired start slot designated by the reservation-completed person for a search for the reserved frame. For this reason, the time slot desired by the reservation-completed person can be reflected on the presentation mode of the continuous frame information 110 of the continuous frames having a possibility of being able to be reserved.

Furthermore, the system control unit 14 acquires the reservation information associated with the user ID of the reservation-completed person from the storage unit 12 that stores the reservation information including the start time and the number of frames of the reserved time frame in association with the user ID used for identifying the user who has made the reservation and estimates the reservation probability based on the tendency of reservations that is acquired from the acquired reservation information. For this reason, the reservation-completed person's tendency of reservations can be reflected on the presentation mode of the continuous frame information 110 of the continuous frames having a possibility of being able to be reserved.

In addition, based on the reservation-completed person's tendency of reservations for a time frame immediately after a reserved frame in a case where a time frame immediately before the time frame that can be reserved excluding continuous frames having a possibility of being able to be reserved is a reserved frame, the system control unit 14 estimates the reservation probability. For this reason, the reservation-completed person's tendency of thinking that the use of a time frame immediately after a time frame used by other persons is not preferable can be reflected on the presentation mode of the continuous frame information 110 of the continuous frames having a possibility of being able to be reserved.

Furthermore, in a case where a time frame immediately before a time frame that can be reserved excluding continuous frames having a possibility of being able to be reserved is a reserved frame, the system control unit 14 estimates the reservation probability based on the golf skills of players using the time frame immediately before the time frame that can be reserved. For this reason, it can be reflected that the time frame that can be reserved is preferably set as the movement destination of the reserved frame on the presentation mode of the continuous frame information 110 of the continuous frames having a possibility of being able to be reserved.

In addition, the system control unit 14 estimates the reservation probability based on the degree of easiness of movement from the address of the reservation-completed person to the golf links. For this reason, the burden of the adjustment of schedules for the movement of time frames can be reflected on the presentation mode of the continuous frame information 110 of continuous frames having a possibility of being able to be reserved.

Furthermore, the system control unit 14 acquires a reservation request from a user that includes the start time and the desired number of frames of continuous frames having a possibility of being able to be reserved, outputs a time frame movement request notification mail to a reservation-completed person who has reserved a reserved frame included in continuous frames represented by the start time and the desired number of frames included in the acquired reservation request, acquires an approval notification message from the user terminal 3 of the reservation-completed person, and, in a case where the approval notification message is acquired, outputs a reservation success notification mail to the reservation-completed person. For this reason, the movement of the reserved frame can be promoted. In addition, in a case where the reservation-completed person accepts the movement of the time frame, the user is notified of the acquisition of continuous frames that can be reserved. For this reason, continuous frames having a possibility of being able to be reserved can be easily reserved.

In addition, the system control unit 14 determines the number of points to be given to a reservation-completed person who has accepted the movement of a reserved frame included in continuous frames that have a possibility of being able to be reserved and are included in the continuous frames requested from a reservation requester to be more as the reservation probability decreases. For this reason, according to the degree of difficulty in accepting the movement of the reserved frame, the reservation completed person who has accepted the movement of the reserved frame can acquire privileges.

2. Second Embodiment

Next, a second embodiment will be described with reference to FIGS. 17 to 19. In the first embodiment, in a case where continuous frames selected by a reservation requester includes a reserved frame, the golf links reservation server 1 transmits a notification requesting the reservation-completed person to move the time frame. In contrast to this, in the second embodiment, a time slot that is accepted by the user as a movement destination of the time frame is registered at the time of performing a reservation. This time slot will be referred to as a "movable time slot". The golf links reservation server 1 automatically moves the reserved frame reserved by the reservation-completed person within a range of the movable time slot. For this reason, the user can reserve continuous frames in a speedy manner.

Figure 17:
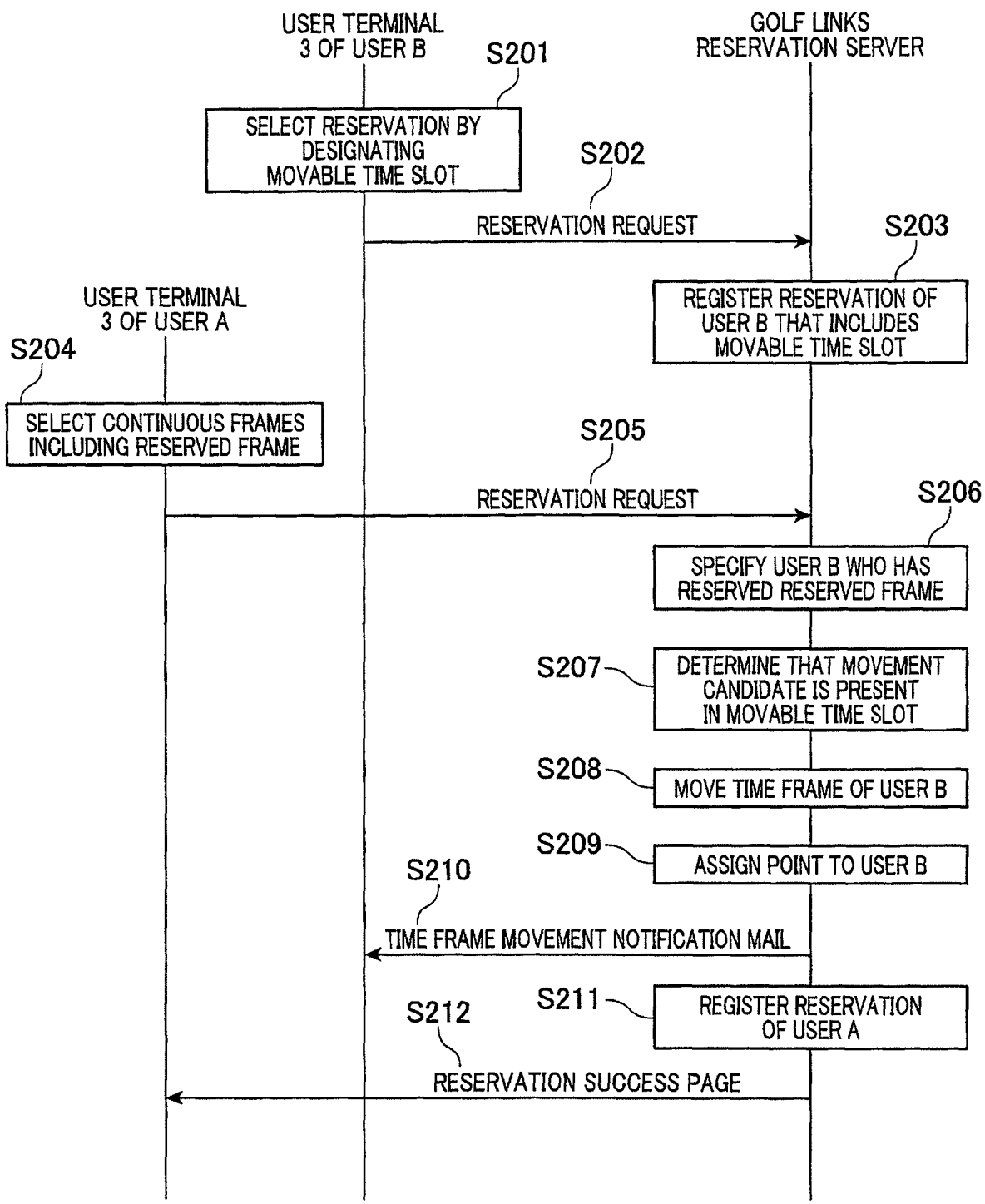
FIG. 17 is a sequence diagram that illustrates schematic processing of an information processing system S according to an embodiment.

FIG. 17 is a sequence diagram that illustrates the schematic processing of the information processing system S according to the present embodiment. As illustrated in FIG. 17, a user B performing a reservation inputs necessary information on the reservation processing page (step S201). At this time, the user B inputs start time and end time as a movable time slot. The user B may or may not designate the moveable time slot. The user terminal 3 of the user B transmits a reservation request including the input information to the golf links reservation server 1 (step S202). The golf links reservation server 1, based on information set in the received reservation request, registers reservation information in the reservation information DB 12d (step S203). At this time, the golf links reservation server 1 registers the reservation information including a movable time slot designated by the user B. FIG. 18 is a diagram that illustrates an example of a content registered in the reservation information DB 12d. Compared to the reservation information DB 12d of the first embodiment illustrated in FIG. 9D, the movable time slot is added in the reservation information DB 12d of the present embodiment as the registered information.

Thereafter, it is assumed that the time frame selection page is displayed in the user terminal 3 of the user A through the process illustrated in FIG. 3. Here, the user A selects the reservation button 115 corresponding to continuous frames including a reserved frame (step S204). Then, on the reservation processing page, when the user A inputs necessary information, the user terminal 3 transmits a reservation request to the golf links reservation server 1 (step S205).

The golf links reservation server 1 that has received the reservation request specifies the user B as a reservation-completed person who has reserved a reserved frame included in the continuous frames selected by the user A (step S206). The golf links reservation server 1 searches for a time frame that is a movement destination candidate for the reserved frame reserved by the user B within the range of the movable time slot set in the reservation information of the user B. Here, it is assumed that the golf links reservation server 1 determines that there is a time frame that is a movement destination candidate (step S207). In this case, the golf links reservation server 1 moves the reserved frame of the user B included in the continuous frames selected by the user A to the time frame of the movement destination candidate within the movable time slot (step S208), Next, the golf links reservation server 1 performs the process of assigning a point to the user B (step S209). Next, the golf links reservation server 1 transmits a time frame movement notification mail to the user B (step S210). Here, the time frame movement notification mail is an electronic mail used for notifying that the reserved frame has been moved. The time frame movement notification mail is an example of a notification of movement of a reserved time frame according to the present invention. In the text of the time frame movement notification mail, for example, a message representing movement of the reserved frame, a content of the reservation after the movement of the reserved frame, a given point, and the like are written.

Next, the golf links reservation server 1 registers the reservation requested from the user A for the continuous frames selected by the user A (step S211). Next, the golf links reservation server 1 transmits a reservation success page to the user terminal 3 of the user A (step S212). The reservation success page is a web page used for giving a notification of acquisition of the continuous frames selected by the reservation requester as continuous frames that can be reserved. The reservation success page is an example of a notification of the desired time frames being time frames that can be reserved according to the present invention. In the reservation success page, for example, a message representing a successful reservation for the continuous frames is displayed. In addition, the golf links reservation server 1 may not automatically register a reservation requested from the reservation requester. The golf links reservation server 1 may only notify the reservation requester of securement of the continuous frames selected by the reservation requester as continuous frames that can be reserved.

In a case where the user B did not designate the movable time frame at the time of performing a reservation or in a case where there is no time frame that is a movement destination candidate in the movable time slot, the golf links reservation server 1 does not move the reserved frame of the user B. In such a case, the golf links reservation server 1 transmits a reservation failure page to the user terminal 3 of the user A. The reservation failure page is a web page used for notifying that the continuous frames selected by the reservation requester cannot be secured as continuous frames that can be reserved. On the reservation failure page, for example, a message representing that the reservation for the continuous frames has failed is displayed.

Figure 19:
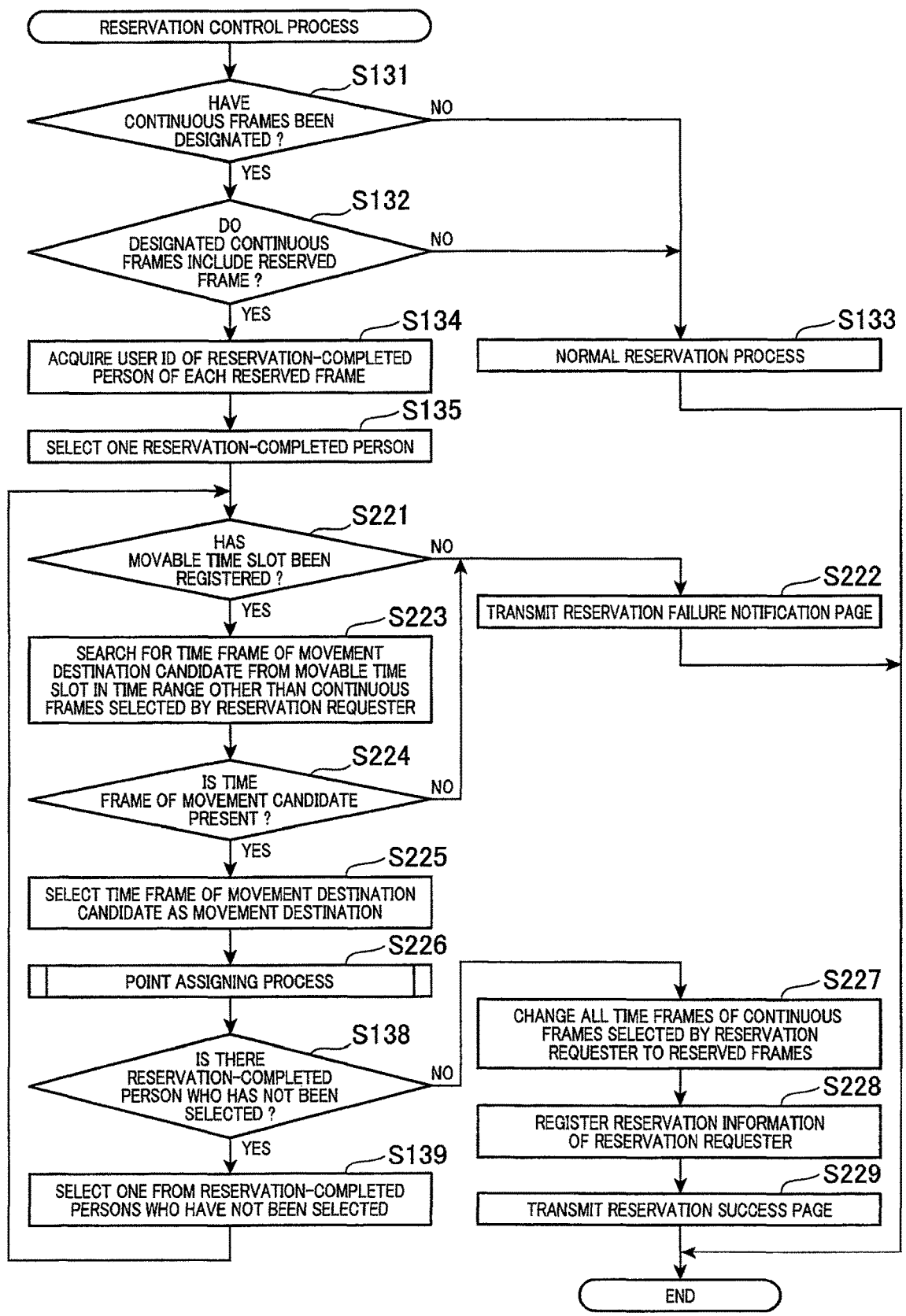
FIG. 19 is a flowchart that illustrates a processing example of a reservation control process performed by a system control unit 14 of a golf links reservation server 1 according to an embodiment.

FIG. 19 is a flowchart that illustrates a processing example of the reservation control process performed by the system control unit 14 of the golf links reservation server 1 according to the present embodiment. In FIG. 19, the same reference sign is attached to the same process as that illustrated in FIG. 14.

As illustrated in FIG. 19, after the execution of steps S131, S132, S134, and S135, the reservation processing unit 145 determines whether or not a movable time slot is registered in the reservation information of the selected reservation-completed person (step S221). At this time, in a case where the reservation processing unit 145 determines that the movable time slot is not registered (No in step S221), the process proceeds to step S222. On the other hand, in a case where the reservation processing unit 145 determines that the movable time slot is registered (Yes in step S221), the process proceeds to step S223. In step S222, the reservation processing unit 145 transmits a reservation failure page to the user terminal 3. Then, the reservation processing unit 145 ends the reservation control process.

In step S223, the reservation processing unit 145 searches for a time frame of a movement destination candidate within the movable time slot registered in the reservation information among time frames other than the continuous frames selected by the reservation requester. Next, the reservation processing unit 145 determines whether or not the time frame of the movement destination candidate is present (step S224). At this time, in a case where the reservation processing unit 145 determines that the time frame of the movement destination candidate is not present (No in step S224), the process proceeds to step S222. On the other hand, in a case where the reservation processing unit 145 determines that the time frame of the movement destination candidate is present (Yes in step S224), the process proceeds to step S225.

In step S225, the reservation processing unit 145 selects the time frame of the movement destination candidate as the movement destination of the reserved frame. In a case where there are a plurality of time frames of movement destination candidates, the reservation processing unit 145 selects one time frame. For example, the reservation processing unit 145 may select a time frame that is closest to the time frame of the movement source. Thereafter, the point assigning unit 146 performs a point assigning process (step S226).

Next, the reservation processing unit 145 determines whether or not there is a reservation-completed person who has not been selected among the reservation-completed persons reserving the reserved frames included in the continuous frames designated by the reservation requester (step S138). At this time, in a case where the reservation processing unit 145 determines that there is a reservation-completed person who has not been selected yet (Yes in step S138), the process proceeds to step S139. In step S139, the reservation processing unit 145 selects one among the reservation-completed persons who have not been selected. Next, the reservation processing unit 145 causes the process to proceed to step S221. On the other hand, in a case where reservation processing unit 145 determines that all the reservation-completed persons have been selected (No in step S138), the process proceeds to step S227.

In step S227, the reservation processing unit 145 changes all the time frames of the continuous frames selected by, the reservation requester to reserved time frames. Next, the reservation processing unit 145 registers the reservation information of the reservation requester in the reservation information DB 12*d* (step S228). The process of steps S227 and S228 is similar to that of step S133 of the reservation control process illustrated in FIG. 14. Next, the reservation processing unit 145 transmits a reservation success page to the user terminal 3 (step S229). Then, the reservation processing unit 145 ends the reservation control process. The reservation processing unit 145 according to the present embodiment is an example of a reservation request acquiring means, a time slot acquiring means, and an outputting means.

As described above, according to the present embodiment, the system control unit 14 acquires a reservation request from a user that includes the start time and the desired number of frames of continuous frames having a possibility of being able to be reserved, acquires a movable time slot of a reservation-completed person who has reserved a reserved frame included in the continuous frames represented by the start time and the desired number of frames included in the reservation request from the storage unit 12 that stores the movable time slot that is accepted by the user who has reserved the time frame as a movement destination of the time frame, and, in a case where a range acquired by excluding the time frames requested to be reserved from the acquired movable time slot includes a time frame that can be reserved as the movement destination of the reserved frame, outputs a reservation success page and outputs the time frame movement notification mail to the reservation-completed person. For this reason, the continuous frames having a possibility of being able to be reserved can be easily reserved. In addition, the reservation-completed person can notice that the reserved frame has been moved.

In addition, in each embodiment described above, a place according to the present invention is applied to a golf links. However, the place according to the present invention may be applied to a place that can be reserved by designating a time frame. For example, the place according to the present invention may be applied to a conference room, a gymnasium, an athletic facility, or the like.

In addition, in each embodiment described above, the information processing apparatus according to the present invention is applied to a server apparatus of a client-server system. However, the information processing apparatus according to the present invention may be applied to any information processing apparatus other than the server apparatus. For example, the information processing apparatus according to the present invention may be applied to the user terminal 3 or the like. For example, a control unit included in the information processing apparatus serves as a means according to the present invention, whereby the control unit may present a search result according to the present invention using a display means such as a display. In such a case, the display means may be included in the information processing apparatus. Alternatively, the display means may be a separate device other than the information processing apparatus.

REFERENCE SIGN LIST

1 Golf links reservation server
2 Golf links terminal
3 User terminal
11 Communication unit
12 Storage unit
12*a* Member information DB
12*b* Golf links information DB
12*c* Reservation status DB
12*d* Reservation information DB
12*e* Operation history DB
13 Input/output interface
14 System control unit
14*a* CPU
14*b* ROM
14*c* RAM
15 System bus
141 First search unit
142 Second search unit
143 Score calculating unit
144 Time frame selection page generating unit
145 Reservation processing unit
146 Point assigning unit
NW Network
S Information processing system

The invention claimed is:

1. An information processing apparatus, comprising:
at least one memory operable to store program code; and
at least one processor operable to access said memory, read said program code, and execute said program code, said program code including:
first search code configured to cause at least one of said at least one processor to search for multiple continuous time frames to be reserved, among a plurality of time frames set as use time frames of a place, in response to a first request from a first user;
second search code configured to cause at least one of said at least one processor to search for two or more continuous time frames including at least one reserved time frame, in response to the first request;
presentation control code configured to cause at least one of said at least one processor to present a search result according to the first search code and a search result according to the second search code, in modes distinguishable from each other;
reservation request acquiring code configured to cause at least one of said at least one processor to acquire, from the first user, a second request that includes the two or more continuous time frames retrieved by the second search code as desired time frames;
request notification outputting code configured to cause at least one of said at least one processor to output a notification of a movement request of the at least one reserved time frame, to a second user who reserved the at least one reserved time frame included in the desired time frames included in the second request acquired by the reservation request acquiring code;
approval notification acquiring code configured to cause at least one of said at least one processor to acquire a notification of approval for the movement of the at least one reserved time frame, from the second user;
possible notification outputting code configured to cause at least one of said at least one processor to, in a case in which the notification of the approval is acquired by the approval notification acquiring code, output a notification indicating to the first user that the desired time frames can be reserved; and
estimation code configured to cause at least one of said at least one processor to estimate a probability of the desired time frames retrieved by the second search code becoming reservable,
wherein the presentation control code is further configured to cause at least one of said at least one processor to control a presentation mode of information of the desired time frames retrieved by the second search code, based on the estimated probability, and
wherein the estimation of the probability of the desired time frames retrieved by the second search code becoming reservable is based on at least one of:
  i) a number of the plurality of other users not including the first user who respectively reserved one or more of the at least one reserved time frame included in the desired time frames retrieved by the second search code,
  ii) a movement width from the at least one reserved time frame included in the desired time frames retrieved by the second search code to a time frame that can be reserved except for the desired time frames retrieved by the second search code,
  iii) a time required until the plurality of other users reserve the at least one reserved time frame after requesting searches,
  iv) a number of searches requested by the plurality of other users until the at least one reserved time frame is reserved by the second user,
  v) a reservation status of a range of time frames excluding the desired time frames retrieved by the second code in time slots designated by the plurality of other users as search conditions for searching for the at least one reserved time frame,
  vi) a tendency of reservations for the plurality of other users based on a reservation result acquired from a reservation result memory that stores the reservation result including the at least one reserved time frame in association with identification information used for identifying the plurality of other users who made reservations,
  vii) skills of players using the time frame immediately before and the time frames that can be reserved, in a case in which the place is an athletic facility and a time frame immediately before time frames that can be reserved, excluding the desired time frames retrieved by the second search code being a reserved time frame, and
  viii) a degree of easiness of movement from addresses of the plurality of other users to the place.

2. The information processing apparatus according to claim 1, wherein the estimation code is further configured to cause at least one of said at least one processor to estimate the probability, based on a number of reserved time frames included in the desired time frames retrieved by the second search code.

3. The information processing apparatus according to claim 1, wherein the estimation code is further configured to cause at least one of said at least one processor to estimate the probability, based on a number of persons intended to use the place in the at least one reserved time frame included in the desired time frames retrieved by the second search code.

4. The information processing apparatus according to claim 1, wherein the estimation of the probability of the desired time frames retrieved by the second search code becoming reservable is based on at least the tendency of the reservations, and
wherein the estimation code is further configured to cause at least one of said at least one processor to estimate the probability, based on a tendency of the plurality of other users for reserving time frames that can be reserved, excluding the desired time frames retrieved by the second search code.

5. The information processing apparatus according to claim 1, wherein the estimation of the probability of the desired time frames retrieved by the second search code becoming reservables is based on at least the tendency of the reservations, and
wherein the estimation code is further configured to cause at least one of said at least one processor to, in a case in which a time frame adjacent to time frames that can be reserved, excluding the desired time frames retrieved by the second search code, is a reserved time frame, estimate the probability, based on a tendency of the plurality of other users to reserve time frames adjacent to the at least one reserved time frame.

6. The information processing apparatus according to claim 1, further comprising:
determination code configured to cause at least one of said at least one processor to determine a privilege assigned to the plurality of other users who accept the movement of the at least one reserved time frame included in the desired time frames that are retrieved by the second search code and are requested by the first user, and determine the privilege to have a higher value as the probability estimated by the estimation code decreases.

7. An information processing method executed by a computer, the information processing method comprising:
first searching for multiple continuous time frames that can be reserved, among a plurality of time frames set as use time frames of a place, in response to a first request from a first user;
second searching for two or more continuous time frames including at least one reserved time frame, in response to the first request;
presenting a search result according to the first searching and a search result according to the second searching, in modes distinguishable from each other;
acquiring, from the first user, a second request that includes the two or more continuous time frames retrieved as desired time frames;
outputting a notification of a movement request of the at least one reserved time frame, to a second user who reserved the at least one reserved time frame included in the desired time frames included in the acquired second request;
acquiring a notification of approval for the movement of the at least one reserved time frame, from the second user;
in a case in which the notification of the approval is acquired, outputting a notification indicating to the first user that the desired time frames can be reserved; and
estimating a probability of the desired time frames retrieved by the second search becoming reservable,
wherein the presenting the search result further comprises controlling a presentation mode of information of the desired time frames retrieved by the second search, based on the estimated probability, and
wherein the estimation of the probability of the desired time frames retrieved by the second search becoming reservable is based on at least one of:
i) a number of the plurality of other users not including the first user who respectively reserved one or more of the at least one reserved time frame included in the desired time frames retrieved by the second search code,
ii) a movement width from the at least one reserved time frame included in the desired time frames retrieved by the second search to a time frame that can be reserved except for the desired time frames retrieved by the second search,
iii) a time required until the plurality of other users reserve the at least one reserved time frame after requesting searches,
iv) a number of searches requested by the plurality of other users until the at least one reserved time frame is reserved by the second user,
v) a reservation status of a range of time frames excluding the desired time frames retrieved by the second search in time slots designated by the plurality of other users as a search conditions for searching for the at least one reserved time frame,
vi) a tendency of reservations for the plurality of other users based on a reservation result acquired from a reservation result memory that stores the reservation result including the at least one reserved time frame in association with identification information used for identifying the plurality of other users who made reservations,
vii) skills of players using the time frame immediately before and the time frames that can be reserved, in a case in which the place is an athletic facility and a time frame immediately before time frames that can be reserved, excluding the desired time frames retrieved by the second search code being a reserved time frame, and
viii) a degree of easiness of movement from addresses of the plurality of other users to the place.

8. A non-transitory recording medium recording an information processing program that causes a computer to:
perform a first search for multiple continuous time frames that can be reserved, among a plurality of time frames set as use time frames of a place, in response to a first request from a first user;
perform a second search for two or more continuous time frames including at least one reserved time frame, in response to the first request;
present a search result according to the first search and a search result according to the second search, in modes distinguishable from each other;
acquire, from the first user, a second request that includes the two or more continuous time frames retrieved as desired time frames;
output a notification of a movement request of the at least one reserved time frame to a second user who reserved the at least one reserved time frame included in the desired time frames included in the acquired second request;
acquire a notification of approval for the movement of the at least one reserved time frame, from the second user;
in a case in which the notification of the approval is acquired by the approval notification acquiring code, output a notification indicating to the first user that the desired time frames can be reserved;
estimate a probability of the desired time frames retrieved by the second search becoming reservable,
wherein the presenting the search result further comprises controlling a presentation mode of information of the desired time frames retrieved by the second search, based on the estimated probability, and
wherein the estimating the probability of the desired time frames retrieved by the second search becoming reservable is based on at least one of:
i) a number of the plurality of other users not including the first user who respectively reserved one or more of the at least one reserved time frame included in the desired time frames retrieved by the second search code,
ii) a movement width from the at least one reserved time frame included in the desired time frames retrieved by the second search to a time frame that can be reserved except for the desired time frames retrieved by the second search code,
iii) a time required until the plurality of other users reserve the at least one reserved time frame after requesting searches,
iv) a number of searches requested by the plurality of other users until the at least on reserved time frame is reserved by the second user,
v) a reservation status of a range of time frames excluding the desired time frames retrieved by the second search in time slots designated by the plurality of other users as a search conditions for searching for the at least one reserved time frame,
vi) a tendency of reservations for the plurality of other users based on a reservation result acquired from a reservation result memory that stores the reservation result including the at least one reserved time frame in association with identification information used for identifying the plurality of other users who made reservations, vii) skills of players using the time frame immediately before and the time frames that can be reserved, in a case in which the place is an athletic facility and a time frame immediately before time frames that can be reserved, excluding the desired time frames retrieved by the second search code being a reserved time frame, and viii) a degree of easiness of movement from addresses of the plurality of other users to the place.

9. The information processing apparatus according to claim 1, wherein the probability of the desired time frames becoming reservable is a probability of the second user moving the at least one reserved time frame to the one of the plurality of time frames not covered by the desired time frames.

10. The information processing apparatus according to claim 1, further comprising:

third search code configured to cause at least one of said at least one processor to search for at least one candidate for the one of the plurality of time frames to which the at least one reserved time frame will move, wherein the reservation changing code is configured to cause at least one of said at least one processor to move the at least one reserved time frame based on a search result according to the third search code.

11. The information processing apparatus according to claim 1, wherein the estimation code is further configured to cause at least one of said at least one processor to estimate the probability of the desired time frames becoming reservable based on information related to at least one reservation for at least one time frame including the at least one reserved time frame among the plurality of time frames.

* * * * *